US008216039B2

(12) United States Patent
Nicely et al.

(10) Patent No.: US 8,216,039 B2

(45) Date of Patent: Jul. 10, 2012

(54) GAMING SYSTEM AND METHOD FOR PROVIDING IMPROVED ELEMENT SETTING OPTIONS

(75) Inventors: Mark C. Nicely, Daly City, CA (US); Ernie M. Lafky, San Francisco, CA (US); Timothy B. Richards, Henderson, NV (US)

(73) Assignee: IGT, Reno, NV (US)

(*) Notice: Subject to any disclaimer, the term of this patent is extended or adjusted under 35 U.S.C. 154(b) by 965 days.

(21) Appl. No.: 12/187,058

(22) Filed: Aug. 6, 2008

(65) Prior Publication Data

US 2010/0035676 A1 Feb. 11, 2010

(51) Int. Cl.
*A63F 13/10* (2006.01)
*A63F 1/00* (2006.01)

(52) U.S. Cl. ........................................ 463/11; 463/21

(58) Field of Classification Search .................... 463/16, 463/11–13, 20, 21; 273/292
See application file for complete search history.

(56) References Cited

U.S. PATENT DOCUMENTS

| | | | | |
|---|---|---|---|---|
| 5,154,429 | A | | 10/1992 | LeVasseur |
| 5,257,789 | A | | 11/1993 | LeVasseur |
| 5,257,810 | A | | 11/1993 | Schorr et al. |
| 5,437,462 | A | | 8/1995 | Breeding |
| 5,636,842 | A | | 6/1997 | Cabot et al. |
| 5,863,042 | A | | 1/1999 | Lo |
| 6,007,424 | A | * | 12/1999 | Evers et al. ..................... 463/13 |
| 6,062,979 | A | | 5/2000 | Inoue |
| 6,155,568 | A | | 12/2000 | Franklin |
| 6,406,023 | B1 | | 6/2002 | Rowe |
| 6,422,940 | B1 | | 7/2002 | Walker et al. |
| 6,457,715 | B1 | | 10/2002 | Friedman |
| 6,474,646 | B1 | | 11/2002 | Webb |

(Continued)

OTHER PUBLICATIONS

The Wizard of Odds, "Pai Gow Poker strategy and odds," Nov. 23, 2007, accessed Jan. 8, 2008.*

(Continued)

*Primary Examiner* — David L Lewis
*Assistant Examiner* — Matthew D. Hoel
(74) *Attorney, Agent, or Firm* — Neal, Gerber & Eisenberg LLP

(57) ABSTRACT

A gaming system having a game with game elements is provided. The game includes a number of game elements provided to the player and the dealer, where the game elements are subsequently divided into two or more groups or hands. The gaming system sets the dealer game elements to form a first dealer hand and a second dealer hand, according to a set of "House-Way" game element setting rules. The gaming system enables the player to either manually set the player game elements to form the first player hand and the second player hand, or elect to have the gaming system automatically set the player hands according to one of several different "House-Way" and/or "Expert-Way" methods. If the player elects to manually set the player hands, the gaming system indicates to the player whether the player's game element setting selections are in accordance with any of the "House-Way" or "Expert-Way" rules. For the player and dealer hands, the first hand must have a rank greater than or equal to the rank of the second hand. If the first and second player hands both beat the corresponding dealer hands, the player wins an award. If only one of the player hands beats the corresponding dealer hand, the outcome of the game is a push. If both of the player hands lose to the corresponding dealer hands, the player loses the round of play of the game.

45 Claims, 22 Drawing Sheets

U.S. PATENT DOCUMENTS

| | | | | |
|---|---|---|---|---|
| 6,491,302 | B1 | 12/2002 | Boylan et al. | |
| 6,631,906 | B1 | 10/2003 | Timpano | |
| 6,726,427 | B2 | 4/2004 | Jarvis et al. | |
| 6,793,220 | B1 | 9/2004 | Feola | |
| 6,811,153 | B1 | 11/2004 | Ko | |
| 6,846,238 | B2 * | 1/2005 | Wells | 463/39 |
| 6,959,927 | B1 | 11/2005 | Jacobs et al. | |
| 6,969,316 | B2 | 11/2005 | Jarvis et al. | |
| 6,986,514 | B2 | 1/2006 | Snow | |
| 7,004,834 | B2 | 2/2006 | Walker et al. | |
| 7,159,868 | B2 | 1/2007 | Webb | |
| 7,195,244 | B1 | 3/2007 | Feola | |
| 7,905,770 | B2 * | 3/2011 | Snow | 463/13 |
| 2002/0163129 | A1 | 11/2002 | Webb | |
| 2003/0006555 | A1 | 1/2003 | Boylan et al. | |
| 2003/0030217 | A1 | 2/2003 | Webb | |
| 2003/0114209 | A1 | 6/2003 | Ritner et al. | |
| 2005/0029742 | A1 | 2/2005 | Snow | |
| 2005/0170875 | A1 | 8/2005 | Snow | |
| 2006/0025213 | A1 * | 2/2006 | Kane et al. | 463/29 |
| 2006/0084505 | A1 | 4/2006 | Yoseloff et al. | |
| 2006/0226604 | A1 | 10/2006 | Saucier | |
| 2006/0244218 | A1 | 11/2006 | Frankel | |
| 2007/0035091 | A1 | 2/2007 | Tang | |
| 2007/0114723 | A1 | 5/2007 | Webb | |
| 2007/0170653 | A1 | 7/2007 | Brunelle | |
| 2008/0090630 | A1 | 4/2008 | Yoshizawa | |
| 2008/0197571 | A1 * | 8/2008 | Okada | 273/292 |

OTHER PUBLICATIONS

Blackjackswitch.com, website <http://www.blackjackswitch.com> printed on Sep. 27, 2007, 5 pages.

Ghost Hunter Advertisement written by Atronic, published in 2003.

Uno and Magic 8 Ball Slots Advertisement, written by Sodak Gaming, Inc., published in 2003.

* cited by examiner

GAMING SYSTEM AND METHOD FOR PROVIDING IMPROVED ELEMENT SETTING OPTIONS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker games have become very popular. One common variation of a poker game is Pai Gow Poker. Pai Gow Poker is a variation of the Chinese domino game Pai Gow using playing cards. Pai Gow Poker is played with a fifty-three card deck, including fifty-two cards from a standard deck of cards and a single Joker. Typically, Pai Gow Poker is played at a gaming table with a physical deck of cards and a live human dealer. However, Pai Gow Poker can also be played on an electronic gaming system with electronic cards. Generally, in Pai Gow Poker, multiple players compete directly against a dealer. Each player attempts to form two high ranking hands from a set of seven initially dealt player cards.

More specifically, a round of play of the game begins after each of the players place an initial wager. Each player is dealt seven cards. After the cards have been dealt, each player views their cards and then arranges the seven cards into a five-card player hand and a two-card player hand. For the player to win, both of the player's hands must beat both of the dealer's hands (as discussed below).

In Pai Gow Poker, the player's five-card hand is evaluated similar to how five card hands are evaluated in a standard game of Five Card Draw Poker, with a few exceptions discussed below. For the player's five-card hand, there are ten general categories or ranks of hands, ranked from highest to lowest, as shown in Table 1 below.

TABLE 1

Ranking of Five Card Poker Hands by Category

| Rank | Hand Type | Example |
|---|---|---|
| 1 | Royal Straight Flush | A♣ K♣ Q♣ J♣ 10♣ |
| 2 | Straight Flush | K♣ Q♣ J♣ 10♣ 9♣ |
| 3 | Four-Of-A-Kind | J♣ J♥ J♦ J♠ 3♣ |
| 4 | Full House | A♥ A♦ A♣ A♦ 6♣ |
| 5 | Flush | A♣ J♣ 8♣ 6♣ 2♣ |
| 6 | Straight | 8♦ 7♣ 6♠ 5♠ 4♣ |
| 7 | Three-Of-A-Kind | Q♠ Q♥ Q♦ 6♦ 2♠ |
| 8 | Two Pair | 8♦ 8♥ 5♥ 5♣ 2♠ |
| 9 | One Pair | K♦ K♠ 8♣ 7♣ 2♥ |
| 10 | High Card | A♥ 10♣ 7♦ 5♠ 3♠ |

When comparing two hands each with five cards, the hand with the higher ranking hand type wins. When the two hands are of the same hand type, then the stronger hand is determined relative to the card ranks making up each hand, with an Ace being the highest card and a two being the lowest card. There is no difference in rank between the four card ranks. All hands can be ranked in a linear ranking from highest to lowest. Because suits are all of the same value, however, there are multiple hands that have identical rankings. For example, a Straight Flush consisting of 5♠6♠7♠8♠9♠ is equivalent to a straight flush of all the same ranks but of a different suit such as 5♥ 6♥ 7♥ 8♥ 9♥.

For the One Pair, Three-of-a-Kind, and Four-of-a-Kind outcomes, the hand with the highest matching rank wins. For example, a Pair of Kings beats a Pair of Tens.

For a Two Pair outcome, the hand with the higher high Pair wins. For example, a hand consisting of 3-3-8-8 beats a hand consisting of 5-5-7-7, since the high Pair of Eights beats the high Pair of Sevens. If the high Pair is the same, then the low Pair is compared. For example, a 5-5-J-J beats a 3-3-J-J because the high Pair matches and the low Pair of Fives beats the low Pair of Threes.

For a Full House, the hand with the higher Three-of-a-Kind wins. For example, K-K-8-8-8 beats an A-A-5-5-5 because the three Eights beat the three Fives.

When comparing Straight, Flush, or Straight Flush hands, the hand with the highest card rank wins. For example, a 7-8-9-10-J Straight beats a 6-7-8-9-10 Straight. In Pai Gow Poker, the highest Straight is a 10-J-Q-K-A. The second highest Straight is an A-2-3-4-5. The third highest straight is a 9-10-J-Q-K.

When comparing two Flush hands, the hand with the highest ranking card wins. If both hands have the same highest ranking card rank, then the next highest card ranks are compared. This is the say way that two High Card hands are compared.

If the winning outcomes are the same between two hands, then the remaining cards in the hand are examined. For example, a 5-3-3-8-8 beats a 4-3-3-8-8. While the high and low Pairs both match, the remaining 5 beats the 4. Likewise, a 4-9-J-8-8 beats a 4-6-J-8-8. The Pair of 8s match, as do the high card Jacks. Looking at the next highest cards, however, the 9 beats the 6.

For the player's two-card hand, there are only two general categories or ranks of hands, ranked from highest to lowest, as shown in Table 1 below.

TABLE 2

Ranking of Two Card Poker Hands by Category

| Rank | Hand Type | Example |
|---|---|---|
| 1 | One Pair | A♣ A♦ |
| 2 | High Card | K♣ 9♥ |

Within each of the two categories, hands are ranked according to the rank of individual cards, with an Ace being the highest card and a two being the lowest card. The highest ranking two-card Pai Gow Poker hand is a pair of Aces (A♥A♠), and the lowest ranking hand includes a two-three combination (e.g., 2♦3♣). The five card hand of the player must beat the two card player hand.

In certain Pai Gow Poker games that include a Joker card, the Joker can only be used as a wild card to complete a Straight, a Flush, a Straight Flush, or a Royal Straight Flush. In the case of completing a Straight, a Flush or a Straight Flush, the Joker is assigned the highest rank possible within that context. For example, in the hand, Joker Q♣J♣10♣9♣8♣, the Joker is evaluated as being a K♣ even though the Joker's evaluation as a 7♣ would also yield a straight flush. In a similar example, in the hand, Joker A♣J♣8♣6♣, the Joker is evaluated as being the largest rank available, which for his example would be the K♣. If a Joker cannot be used to complete a Straight, a Flush, a Straight Flush, or a Royal Straight Flush, the Joker is given the value of an Ace.

After each of the players have arranged their seven cards into a five-card player hand and a two-card player hand, the dealer arranges the seven dealer cards into a five-card dealer hand and a two-card dealer hand according to a set of rules commonly known as "House-Way" rules. The "House-Way" rules can vary from one gaming establishment to another, as described further below. For each of the players, after the dealer has arranged the set of seven dealer cards to form the five-card dealer hand and the two-card dealer hand, the dealer compares the five-card player hand to the five-card dealer hand and the higher ranking hand wins. The dealer then compares the two-card player hand to the two-card dealer hand. If the rank of the five-card player hand is the same as the rank of the five-card dealer hand and if the rank of the two-card player hand is the same as the rank of the two-card dealer hand, the player loses the wager. This type of a tie-tie situation is sometimes referred to as a copy. If both of the five-card player hand and two-card player hand beat the respective dealer hands, then the player wins an award. If the dealer five-card hand and two card hand beat the respective player hand, the player's wager is forfeited to the casino. Under certain Pai Gow Poker house rules, if the player wins, the house may take a defined percentage of the player's wager (known as a commission or as a vigorish or a "vig"). If the player wins one hand but loses the other hand, the player pushes on the round of play of the game and the player's wager is returned. In Pai Gow Poker, this type of a tie (i.e., one winning hand and one losing hand) occurs fairly often. If the player loses with both of the player hands, the player loses the wager.

In Pai Gow Poker, there are several rules or restrictions that dictate how the player must form the five-card and two-card player hands. For example, the two-card player hand must rank lower than the five-card player hand. For example, if both the two card hand and the five card hand are of the type One Pair, the two card hand is not allowed to have a higher ranking pair than the five card hand. Similarly, if both the two card hand and the five card hand are of the hand type High Card, the two card hand is not allowed to have a higher ranking high card than the five card hand. However, if the five card hand is of hand type Two Pair and the two card hand is of type One Pair, the pair in the two card hand can be of higher rank than either pair within the five card hand because the five card hand is of higher hand type. If a player mistakenly sets the two-card player hand to have a higher rank than the five-card player hand (e.g., a five-card hand having only a high card ranking such as A♥K♠9♣6♣4♦, and a two-card hand having a pair such as Q♥Q♣), then both hands are determined to be "foul." When the game is offered on a physical table with a live dealer, certain gaming establishment rules will result in a "foul" hand automatically losing. When the game is offered on a video-based gaming device, said gaming device typically warns the player of the attempt at setting a foul hand and prompts the player to correct their setting. In a video-based gaming device that supports multi-player play, a time limit may be established. If a given player is unable to set the player's hand within an allotted period of time, the gaming system will set the player's hand on the player's behalf according to the House Way rules. In certain gaming establishments, a player may request that the dealer set said player's hand according to house way rules. When the game is offered on a physical table with a live dealer, the setting of a player hand is typically handled as follows. A player places the cards face down in a single stack and announces to the dealer the desire for the dealer to set that hand. After all other players at the table have set their own hand, the dealer will assist any players requesting house setting one at a time. For a given player, the dealer will reveal that player's cards, set the cards according to the House Way rules, and then place the cards in the areas that the player would normally do so themselves. Casinos typically use this order of operation to prevent players from seeing any cards other than their own before setting their own hand as casinos are concerned that an expert player may be able to achieve an advantage against the casino if the player is able to deduce what cards the dealer holds by a process of elimination regarding revealed player cards.

Under certain Pai Gow Poker gaming configurations, a player may elect to act as the banker. When the player plays the role of the banker, the player competes against the other player or players at the table. If the player who is playing the role of banker wins, the player-banker wins an award and a commission based on the winnings is paid to the house. Under certain game rules, when a player is acting the role of banker, the dealer still participates in the game. In general, the opportunity for player to play the role of banker rotates around the table. Alternately, the opportunity to play the role of the banker may alternate between player and dealer between each round of play. However, as mentioned above, the players may alternatively elect to decline this option. If a player elects to play the role of the banker, he/she must have enough money to pay losses to the other players and the dealer assuming that the player/banker loses too all of the other players and the dealer.

One factor in determining a player's odds of beating the dealer (or other player-banker) is based upon the way in which a player arranges the player's cards to form the five-card player hand and the two-card player hand. That is, there are many ways that a player could set their cards without having "foul" hands, but there are card setting strategies that can optimize the player's probability of beating the dealer. In certain known Pai Gow Poker games, whether the games are computer-based or dealt by a live human dealer, the games include the following characteristics: (a) the cards in the dealer hand are set according to a set of "House-Way" rules; and (b) a player can either set their own cards according to the rules of the game or can request to have the dealer set the cards in the player's hand according to the "House-Way" rules. In general, the "House-Way" rules are not the same as optimal play rules. "House-Way" rules are generally simplified rules relative to optimal play rules because the simplified rules are not overly complex and enable a human dealer to learn, remember and execute simple rules to reduce chance of dealer errors and to reduce chance of player disputes.

The "House-Way" rules can differ based on the preferences of the gaming establishment, local gaming regulations, regional customer preferences, and/or other factors. One example of a set of "House-Way" rules for setting the dealer hands is outlined below. As mentioned above, the dealer receives seven cards and must divide the seven cards into a five-card dealer hand and a two-card dealer hand, where the five-card dealer hand must have a higher rank than the two-card dealer hand.

Under this example set of "House-Way" rules, if the seven dealer cards do not include a pair (e.g., A♥, K♠, J♣, 8♥, 6♣, 4♦ and 3♠), the dealer must place the highest value card (A♥) in the five-card dealer hand and must place the next two highest cards (K♠J♣) in the two-card dealer hand. By placing the highest value card in the five-card dealer hand, the hands are not "foul." Moreover, even assuming that the dealer will lose the five-card dealer hand, placing the next two highest cards in the two-card dealer hand will maximize the probability that the dealer will win at least one of the two hands and tie the player(s). Certain "House-Way" rules are designed to maximize the probability that the dealer will tie the player (i.e., that the dealer will have one winning hand and one losing hand).

If the seven dealer cards include one pair (e.g., A♠, K♠, J♣, J♥, 6♠, 4♦ and 3♣), the dealer must place the pair (J♣J♥) in the five-card dealer hand and the next two highest value cards (A♠K♠) in the two-card dealer hand. In this example rule, the Ace and the King are more useful in the two-card dealer hand, and would not significantly affect or improve the rank of the five-card dealer hand.

If the seven dealer cards include two pairs, the dealer must place both of the pairs in the five-card dealer hand except in the following circumstances:

(a) if one of the pairs is sevens or greater and there are no singleton Aces (i.e., a non-paired Ace), then place the higher pair in the five-card dealer hand and the lower pair in the two-card dealer hand;

(b) if one of the pairs is Jacks or better, if the other of the pairs is sixes or better, and there is a singleton Ace, then place the higher pair in the five-card dealer hand and the lower pair in the two-card dealer hand; and (c) if one of the pairs is a pair of Aces, then place the pair of Aces in the five-card dealer hand and the lower pair in the two-card dealer hand. In this case, because the pair of Aces is already a high pair (and relatively high ranking five-card hand) the benefit of placing the lower pair in the two-card dealer hand exceeds the detriment of sacrificing a Two Pair hand as the five-card dealer hand.

If the seven dealer cards include three pairs (e.g., A♥, A♣, 10♥, 10♣, 6♠, 6♦, and J♥) always place the highest ranking pair (A♥A♣) in the two-card dealer hand and place the remaining two pair (10♥, 10♠ and 6♣6♦) in the five-card dealer hand.

If the seven dealer cards include a Three-Of-A-Kind, the dealer must place the Three-Of-A-Kind in the five-card dealer hand unless the Three-Of-A-Kind includes three Aces. If the Three-Of-A-Kind includes Aces, place a pair of Aces in the five-card dealer hand, and place the third Ace in the two-card dealer hand.

If the seven dealer cards include a Full House (e.g., K♠, K♦, K♣, 4♦, 4♠, 9♦ and 7♣), the dealer must split the Full House into a Three-Of-A-Kind (K♠, K♦, K♣) and a pair (4♦, 4♠) with the Three-Of-A-Kind being placed in the five-card dealer hand. This rule has the following exceptions:

(a) if the Full House include a pair of twos, the Full House does not need to be split up; and (b) if the remaining two cards of the seven dealer cards are an Ace and a King, the Full House does not need to be split up.

If the seven dealer cards include a Full House with a Three-Of-A-Kind and two pairs (e.g., K♠, K♦, K♣, 4♦, 4♣, 9♦ and 9♣), the dealer must place the higher of the two pairs (i.e., 9♦9♣) in the two-card dealer hand. In this example hand, a Full House is likely to beat most five-card player hands. Therefore, the marginal benefit of having a higher pair in the five-card dealer hand is less than the marginal benefit of having a higher pair in the two-card dealer hand. In a single deck game having only four Kings, it would not be possible for another player to be dealt three Kings because the deck includes only one remaining King. Therefore, because no other player could be dealt a Full House including three Kings, there is no marginal benefit to having a higher second pair in the five-card dealer hand.

If the seven dealer cards include two separate Three-Of-A-Kinds (e.g., J♥, J♦, J♠, 2♥, 2♣, 2♣, 6♦), the higher ranking of the two Three-Of-A-Kinds (i.e., J♥J♦J♣) should be split up and the pair of Jacks should be placed in the two-card dealer hand. In the example above, the final five-card dealer hand would include 2♥, 2♠, 2♣, J♥, 6♦, and the final two-card dealer hand would include J♦, J♣. Because a Three-Of-A-Kind is a relatively high ranking hand, the marginal benefit of having a higher ranking pair (e.g., J♥J♦ instead of 2♥2♠) is greater than the marginal benefit of having a higher valued Three-Of-A-Kind. Moreover, the marginal benefit of forming a Full House in the five-card dealer hand (e.g., J♥, J♦, J♣, 2♥, 2♠) is not high enough to forego forming a pair in the two-card dealer hand.

If the seven dealer cards include a Straight, a Flush, a Straight Flush, or a Royal Straight Flush, use these five cards in the five-card dealer hand except in the following circumstances where the seven dealer cards also include two pairs:

(a) if the seven dealer cards include an Ace singleton (e.g., the following hand includes Two Pair, a Hearts Flush, and an Ace singleton: A♥, K♥, K♦, 10♥, 10♣, 9♥, 3♥);

(b) if the seven dealer cards include a pair of Jacks and a pair of Sixes (e.g., A♥, J♥, J♦, 6♥, 6♣, 9♥, 3♥); and (c) if the seven dealer cards include a pair of Aces and any other pair (A♥, A♦, K♥, 10♥, 8♥, 3♥, 3♥).

If the seven dealer cards include a six or seven card Straight or Flush (e.g., K♥, Q♥, J♦, 10♣, 9♣, 8♥, 7♥), form the highest possible two-card dealer hand (K♥, Q♥) while maintaining the Straight or Flush in the five-card dealer hand (J♦, 10♣, 9♣, 8♥, 7♥). If the seven dealer cards include a Straight Flush (e.g., J♥, 10♥, 9♥, 8♥, 7♥, 4♥, 2♣), form only a Straight or Flush in the five-card dealer hand if the two-card dealer hand can be made to include a Jack or higher. In the example above, the five-card dealer hand should be set to include a Flush (10♥, 9♥, 8♥, 7♥, 4♥), and the two-card dealer hand should be set to include the J♥ and 2♣. If the seven dealer cards include a Royal Straight Flush (e.g., A♥, K♥, Q♥, J♥, 10♥, 6♥, 2♣), form only a Straight or Flush in the five-card dealer hand if the two-card dealer hand can be made to include an Ace or higher. In the example above, the five-card dealer hand should be set to include a Flush (K♥, Q♥, J♥, 10♥, 6♥), and the two-card dealer hand should be set to include the A♥ and 2♣.

If the seven dealer cards include a Four-Of-A-Kind, whether to split the Four-Of-A-Kind into two separate pairs is determined according to the rank of the Four-Of-A-Kind as follows:

(a) if the rank is a Two through Six (e.g., 4♥, 4♦, 4♠, 4♠, J♥, 10♣, 2♥), always keep the Four-Of-A-Kind together;

(b) if the rank is Seven through Ten, split the Four-Of-A-Kind into two pairs unless an Ace or better can be played in the two-card dealer hand;

(c) if the rank is a Jack through King, split the Four-Of-A-Kind into two pairs unless the hand also includes a pair of Tens or higher (e.g., the Four-Of-A-Kind in the following hand should not be split J♥, J♦, J♠, J♠, 10♥, 10♣, 2♥); and (d) if the rank is Aces, split unless the seven dealer cards also include a pair of Sevens or higher (e.g., the Four-Of-A-Kind in the following hand should not be split A♥, A♦, A♠, A♠, 7♥, 7♣, 2♥).

Finally, if the seven dealer cards include five Aces, split the five Aces up (i.e., three Aces in the five-card dealer hand and two Aces in the two-card dealer hand) unless a pair of Kings can be played in the two card dealer hand (e.g., the five Aces in the following hand should not be split A♥, A♦, A♠, A♠, A♥, K♣, K♥).

As mentioned above, although the above example of "House-Way" rules has been explained, the "House-Way" rules can differ from gaming establishment to gaming establishment. For instance, in a second example of "House-Way" rules, the rules for splitting Two Pair differ slightly from the first example of "House-Way" rules described above. In this second example set of "House-Way" rules, if the seven dealer cards include Two Pair, the pairs are split except in the following situations:

(a) if both of the pairs are of a rank of six or less;
(b) if both of the pairs are of a rank of ten or less and there is an Ace singleton; and
(c) if one pair is a rank of Jack or greater, one pair is a rank of five or less, and there is an Ace singleton.

Certain players seek out variations to card games such as Pai Gow Poker. A need therefore exists for gaming systems, gaming devices and gaming methods which provide new and exciting card games with high degrees of player interaction.

SUMMARY

Various embodiments of the present disclosure relate to a gaming system or gaming device for providing a Pai Gow Poker game, and methods of playing and operating a Pai Gow Poker game at a gaming table or through a gaming device. Certain of the embodiments include a Pai Gow Poker card game where the gaming system enables a player to select from a plurality of different automatic player hand setting methods. In other embodiments, the gaming system enables only certain players to select from different hand setting methods, where the players must first meet one or more qualifying conditions to be eligible. In certain other embodiments, the gaming system provides two or more ways for the casino or the player to specify dealer hand setting rules. In other embodiments, the gaming system includes different automatic card setting rules for the player hands and the dealer hands. In certain other embodiments, the gaming system enables the player to set the cards in the player hand, and then indicates to the player if their card setting choices match the criteria for either the "House-Way" rules or if the player has achieved optimally set hands. As mentioned above, it should be appreciated that certain "House-Way" rules are simplified to facilitate the training of and execution by human dealers and may not always reflect optimal hand setting choices.

In one embodiment of a Pai Gow Poker game, the gaming system includes a plurality of hand setting ways to specify automatic player hand setting. The hand setting ways that can be used to set a player hand include the "House-Way" rules that are used in setting the dealer hands, a plurality of other "House-Way" rules that are used by different gaming establishments, and optimal play or "Expert-Way" rules. In one embodiment, the gaming system enables each player to select from the different hand setting ways for that player. In other embodiments, the player must meet one or more qualifying conditions to be able to select from the different hand setting ways. In one such embodiment, for an online implementation where a player can play the game for free or can play it for actual money, only the players playing for actual money can select from the different hand setting ways. In another embodiment, players must place at least a specific minimum wager to have the option to select from the different hand setting ways. In one example, if the player places a large enough wager, the gaming system enables the player to select the optimal way or "Expert-Way" of setting the cards in the player hand. In another embodiment, players must have at least a specific minimum credit balance to have the option to select from the different hand setting ways. In another embodiment, players must be playing with a player tracking card to have the option to select from the different hand setting ways. In another embodiment, if a player has a certain casino club standing or membership, the gaming system enables the player to select from the different hand setting ways. In another embodiment, a separate wager or pre-payment is required in order for the player to have the option to select from the different hand setting ways. In another embodiment, the gaming system enables the player to pay for the privilege to select from the different hand setting ways during the course of the play of the game. In another embodiment, the player must place a side wager of a particular amount to have the privilege of selected from the different hand setting ways. In another embodiment, the player who is acting in the role of banker has the option to select from the different hand setting ways.

In one embodiment of a video based Pai Gow Poker game, the gaming establishment can select "House-Way" rules for the video Pai Gow Poker gaming devices to match the rules of:

(a) felt-based table games offered at that particular gaming establishment;
(b) felt-based table games offered within the consortium to which the gaming establishment belongs; or
(c) the local market.

On a single-player gaming device, such as offered via the Internet or other networked gaming table, the gaming system provides the player with the option of selecting the set of "House-Way" rules that will be used by the gaming system.

In one embodiment of a Pai Gow Poker game, the gaming system enables the player to set the cards in the player hands based on the player's own strategy, and then provides a signal or other indication to the player to alert the player whether or not their chosen card setting decisions correspond with the criteria for one or more different "House-Way" rules and the "Expert-Way" rules. In this embodiment, if the player sets their hands poorly, albeit not in a manner contrary to game rules and which will produce a foul setting, the gaming system provides an indication to the player that the player's hand is not set according to the "House-Way" rules and/or is not set optimally or by the "Expert-Way." The gaming system then enables the player to either reset their cards manually or by any of the available "House-Way" or "Expert-Way" rules. In certain embodiments, if a player receives an indication from the gaming system that they have not set their hand optimally, the player must pay a fee or surcharge to have the gaming system reset the player's hands optimally or according to a set of "House-Way" rules. Therefore, this feature provides either a validation to a player that they have correctly set their cards, or an automatic resetting the player cards if the player sets their hands sub-optimally. Accordingly, novice or intermediate players may practice creatively with their own card setting theories/strategies, but also have an assurance that if they set their cards incorrectly, the gaming system will automatically make corrections or give the player an option to make any corrections by selecting any of a number of "House-Way" or "Expert-Way" rule sets.

Although Pai Gow Poker is used in several examples described below, it should be appreciated that the embodiments can be applied to the Chinese domino Pai Gow game, and can be applied to other suitable video or non-video based card games that include a feature of enabling a player to set cards to form different player hands. The embodiments can also be applied to slot machine games or other non-card games.

Additional features and advantages are described herein, and will be apparent from, the following Detailed Description and the figures.

BRIEF DESCRIPTION OF THE FIGURES

FIG. 2B is a schematic diagram of the data network that one or more of the gaming devices of the present disclosure may be connected to.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment; (3) a multiplayer gaming table having physical cards, a live dealer, and a card tracking mechanism; and (4) a multiplayer gaming table having multiple display devices and virtual cards. In one embodiment, the computerized instructions for controlling any games are executed by at least one central server, central controller, or remote host. In such a "thin client"embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client"embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
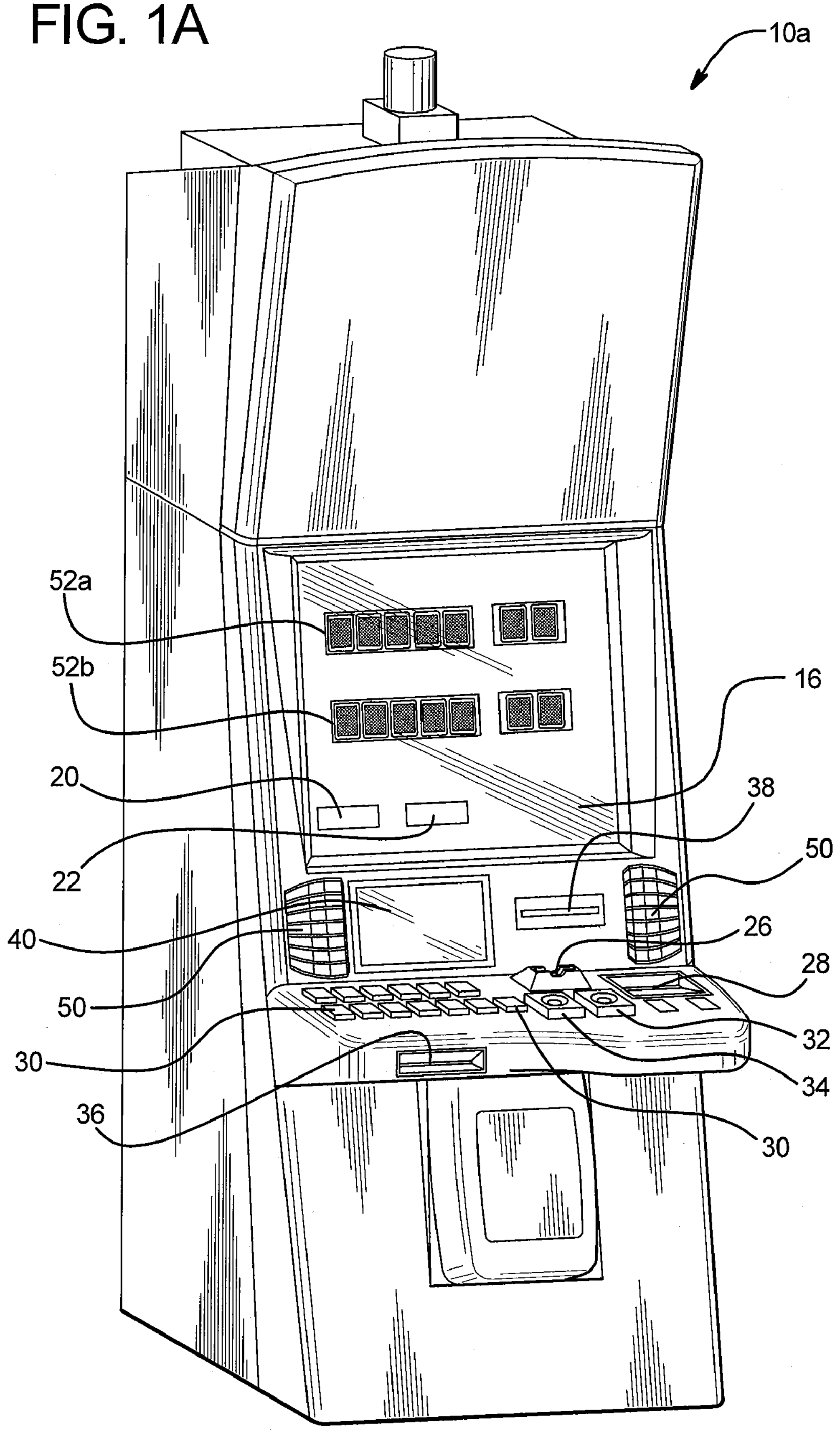
FIG. 1A is a front perspective view of one embodiment of the gaming system of the present disclosure.
Figure 1B:
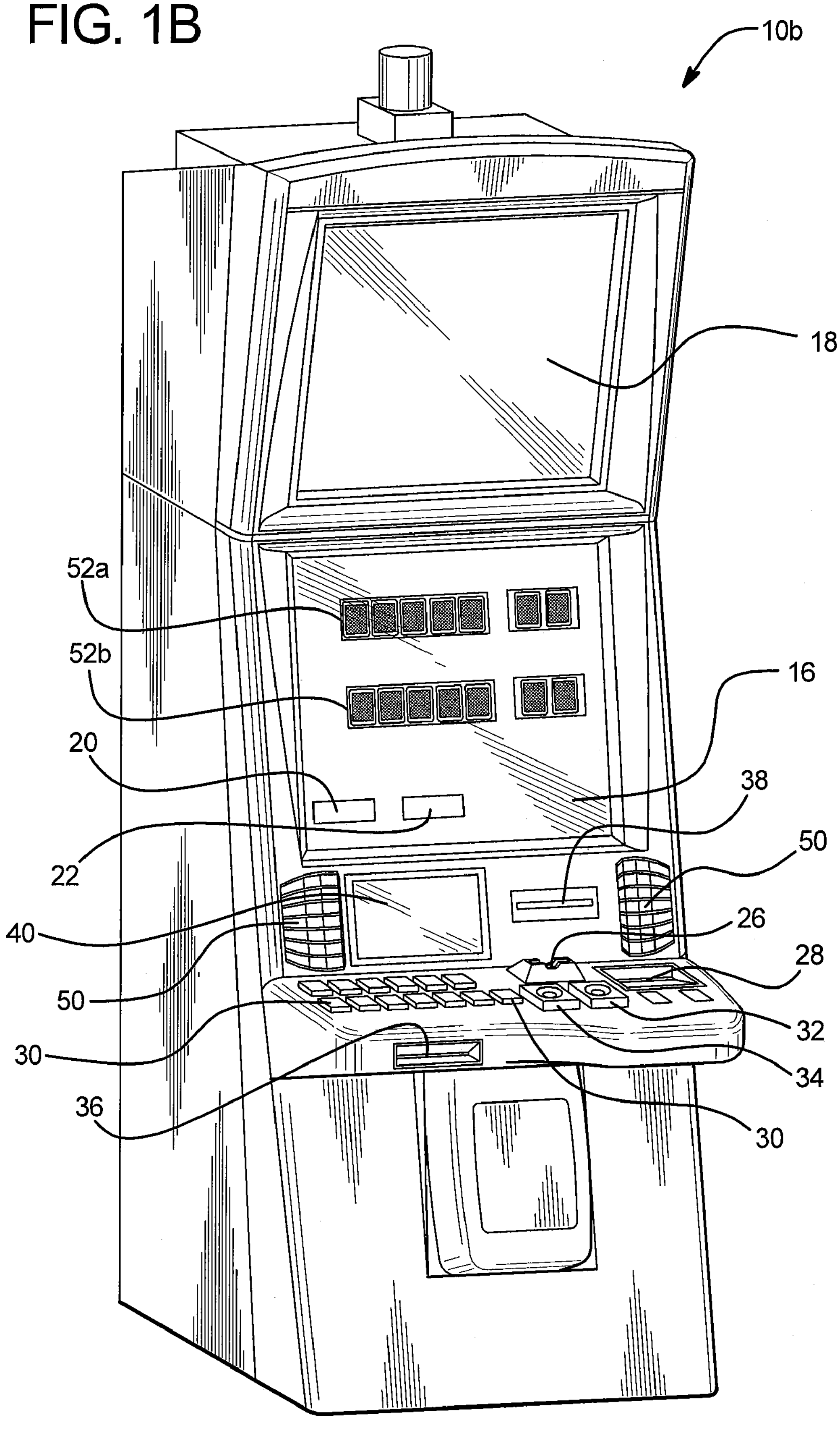
FIG. 1B is a front perspective view of one embodiment, of the gaming system of the present disclosure.

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

Figure 1C:
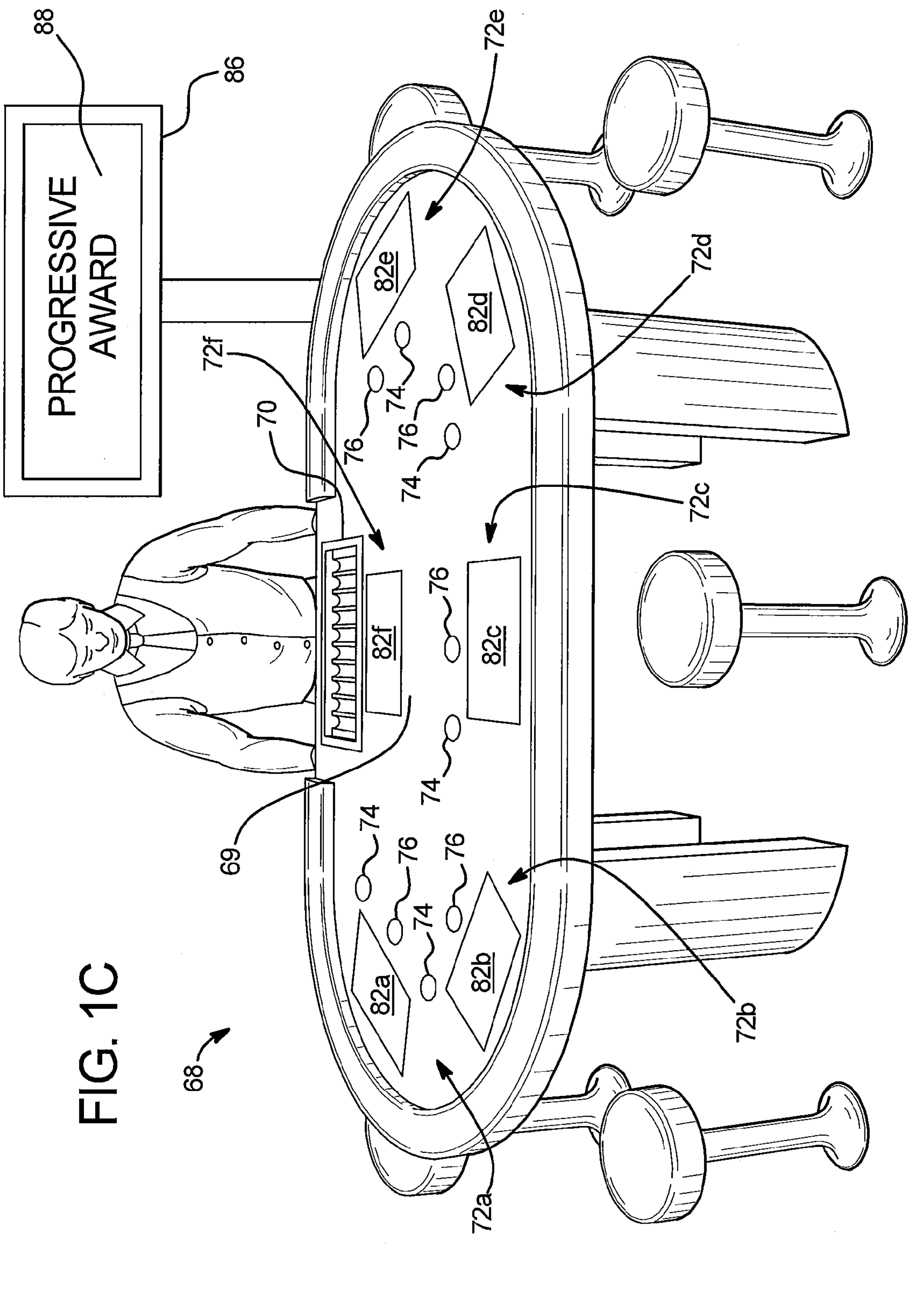
FIG. 1C is a front perspective view of one embodiment, of the gaming system of the present disclosure, where the gaming system is configured as a table game.
Figure 1D:
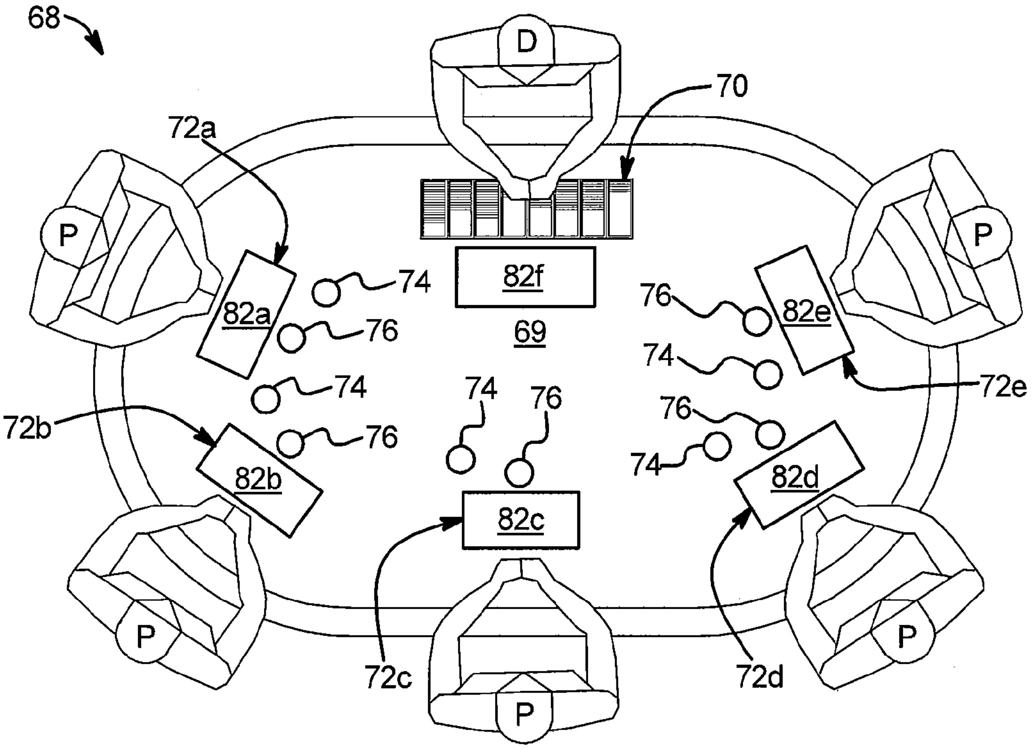
FIG. 1D is a top view of the gaming system of FIG. 1C.
Figure 1E:
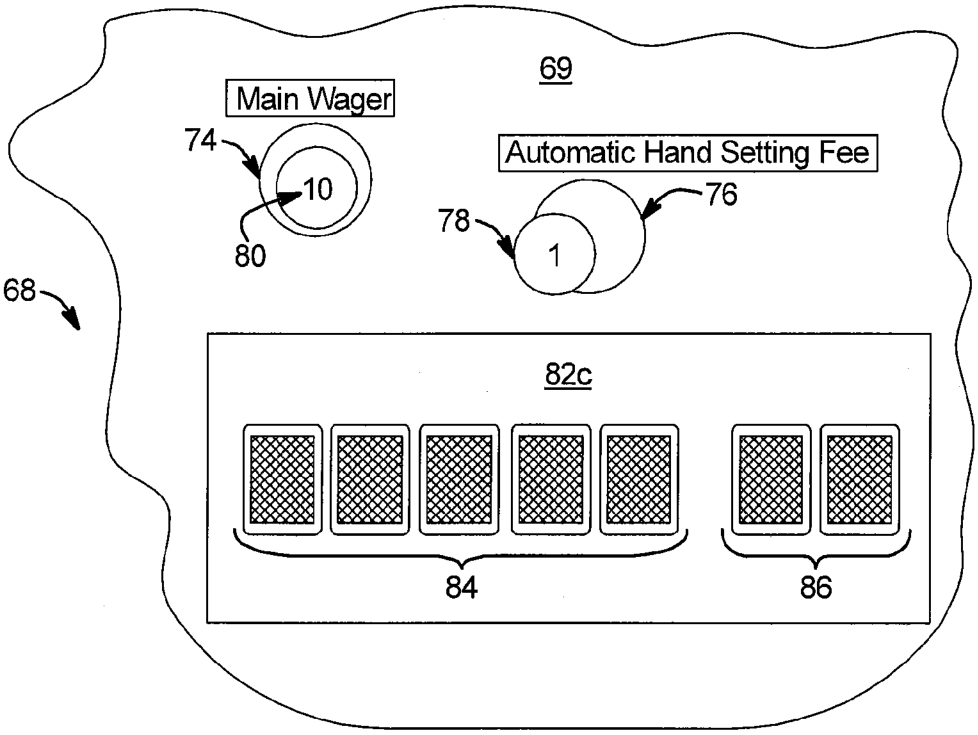
FIG. 1E is an enlarged fragmentary top view of a section of the gaming table illustrated in FIG. 1D.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations. In another embodiment, as shown in FIGS. 1C, 1D and 1E, the gaming device can be a gaming table such as a Pai Gow Poker table and the game is dealt with a human dealer. In this embodiment, the dealer deals the cards to each of the players and the dealer. Then, the player can look at the cards to determine a card setting strategy or to decide to select one of the automatic hand setting options. If the player selects an automatic hand setting option, the gaming system applies the card setting method based on the values of the player cards (which can be identified by a card tracking device included in the gaming table) and provides feedback to the player or the dealer as to how to set the player's cards.

Figure 2A:
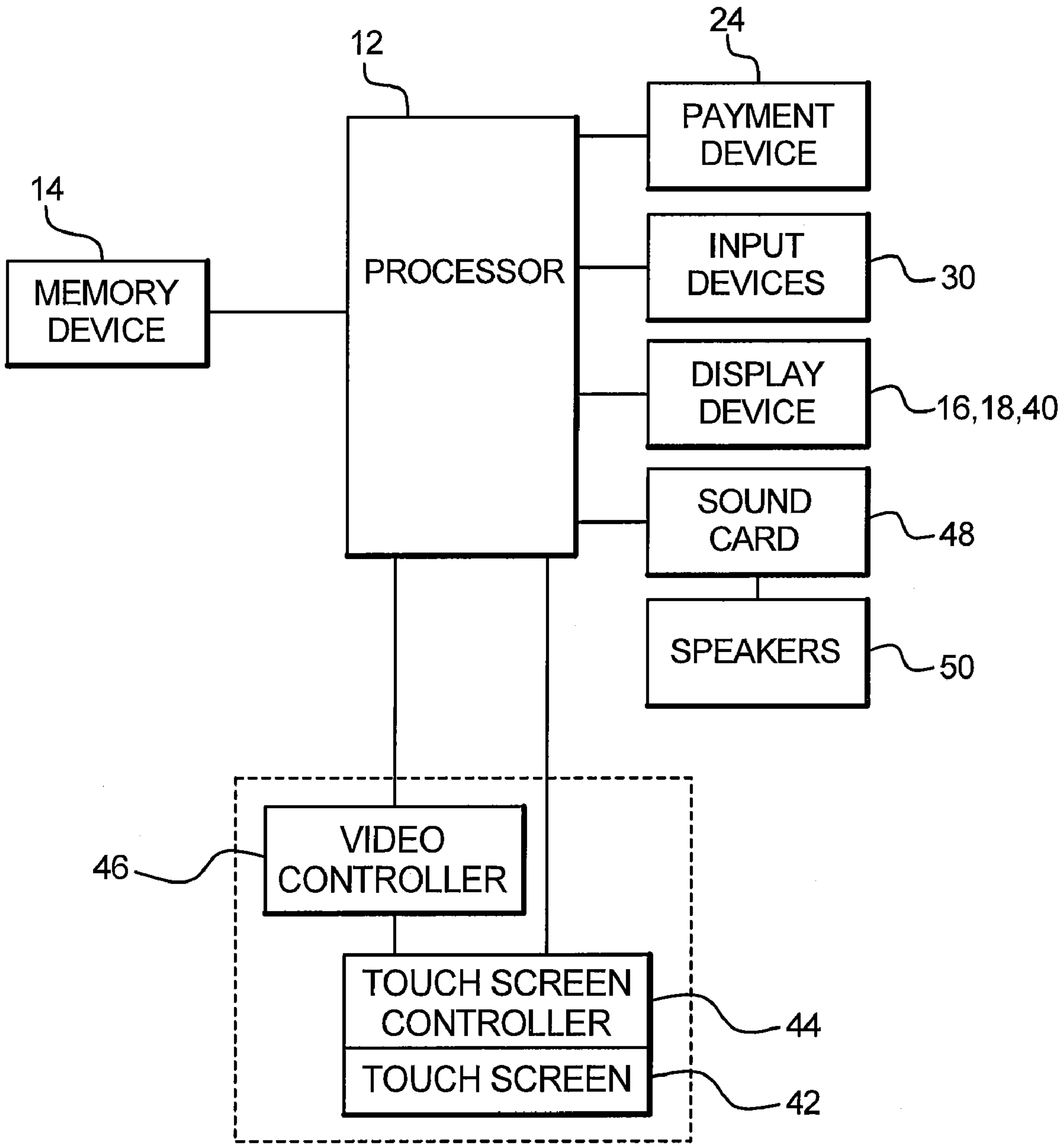
FIG. 2A is a schematic diagram of the electronic configuration of one embodiment of the gaming device of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status. In another embodiment, as shown in FIGS. 1C, 1D and 1E, at least one of the display devices is part of a live gaming table such as a Pai Gow Poker table.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

In one embodiment, as shown in FIG. 1C, the gaming system includes a multiplayer gaming table 68 for a Pai Gow Poker game. The game is played on a playing surface 69 of the gaming table 68, with a live human dealer. The gaming table 68 generally includes a chip tray 70 for holding several stacks of the dealer's chips. The dealer uses chips from the chip tray 70 to pay out winning hands or collect chips from players when they have lost. For each of a plurality of playing areas 72*a* to 72*e*, there is a primary game wagering area 74. The gaming table 68 also includes a dealer playing area 72*f* and a dealer display device 82*f*. In one embodiment of a Pai Gow Poker game a secondary game wagering area 76 (best seen in FIG. 1E) is provided. In this embodiment, a secondary wager, fee or surcharge 78 is placed in the secondary game wagering area 76 to have the gaming system automatically reset the player hands according to either the "House-Way" rules or "Expert-Way" rules, as discussed below. In one embodiment, prior to the initiation of the round of Pai Gow Poker, each player places his or her primary wager substantially within the primary game wagering areas 74. Generally, as seen in FIG. 1E, the secondary game wager 78 will be smaller than the primary game wager 80.

As seen in FIG. 1C, the gaming table includes a plurality of display devices 82*a* to 82*e*, one for each of the players. In one embodiment, where the Pai Gow Poker game is played with virtual playing cards, the display devices are used for displaying the cards in the five card player hand 84 and the cards in the two-card player hand 86 (best seen in FIG. 1E). In another embodiment shown in FIGS. 1C, 1D and 1E, physical playing cards are used. In this embodiment, the dealer deals cards to form player and dealer hands from a standard physical deck of cards. In this embodiment, the gaming table also includes a card tracking mechanism to track the values of each card dealt to each of the players and the dealer. Therefore, the cards can be identified and stored into a memory device. Where the game played is Pai Gow Poker, the gaming system tracks the value of each of the seven player cards and determines how the cards should be set in order to correspond to one or more "House-Way" rule sets (as discussed below). In one embodiment, the gaming system enables each of the players to set the cards in their respective five-card and two-card player hands. After each of the players have finished setting their respective player hands, the gaming system uses the information about the values of the tracked player cards to compare each of the players' card setting strategies to the "House-Way" rules or "Expert-Way" rules. If a player's card setting strategy matches the "House-Way" rules or "Expert-Way"rules, the gaming system provides an indication to the player regarding same. If a player's card setting strategy does not match the "House-Way" rules or "Expert-Way" rules, the gaming system provides and indication to the player and also enables the player to optionally reset the five-card and two-card player hands to correspond with the "House-Way" rules or "Expert-Way" rules, as discussed further below. In one example, the card tracking system designates that one or more cards from the two-card player hand should be substituted with one or more cards from the five-card player hand. In an embodiment where the gaming table 68 includes one or more display devices 82*a*, 82*b*, 82*c*, 82*d* and 82*e*, the gaming system provides a visual display or animation regarding the recommended card reset, and the display devices display a virtual representation of the player's physical cards. The display devices 82*a*, 82*b*, 82*c*, 82*d* and 82*e* can also display information about the "House-Way" and/or "Expert-Way" rules, and can display instructions to the player regarding resetting their hands in accordance with the "House-Way" and/or "Expert-Way" rules.

In a further embodiment, as shown in FIG. 1C, the gaming table 68 includes another display device 86 that displays a progressive award 88. The progressive award 88 may be determined by the play of just one particular round of Pai Gow Poker, it may be determined by several rounds of Pai Gow Poker, or it may be determined by contributions from different gaming tables 68 throughout the gaming establishment, each gaming table 68 linked through a network.

In one embodiment, as illustrated in FIGS. 1A and 1B, a base or primary game may be a Pai Gow Poker game having five and two card dealer hands 52*a* and five and two card player hands 52*b*. In certain of these Pai Gow Poker embodiments, the gaming system or gaming device enables the player to play a first five-card player hand against a first five-card dealer hand, and play a second two-card player hand against a second two-card dealer hand. In one embodiment, the gaming system deals seven player and seven dealer cards. The gaming system enables the player to set the seven player cards into the five-card player hand and the two-card player. The gaming system also sets the seven dealer cards into a five-card dealer hand and a two-card dealer hand. The five-card player hand competes against the five-card dealer hand, and the two-card player hand competes against the two-card dealer hand, as discussed in further detail below. The gaming system provides the player with an award if the player wins both of the hands. In certain embodiments, the Pai Gow Poker game may include a plurality of player or dealer selectable automatic hand setting rule sets, as discussed in further detail below.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
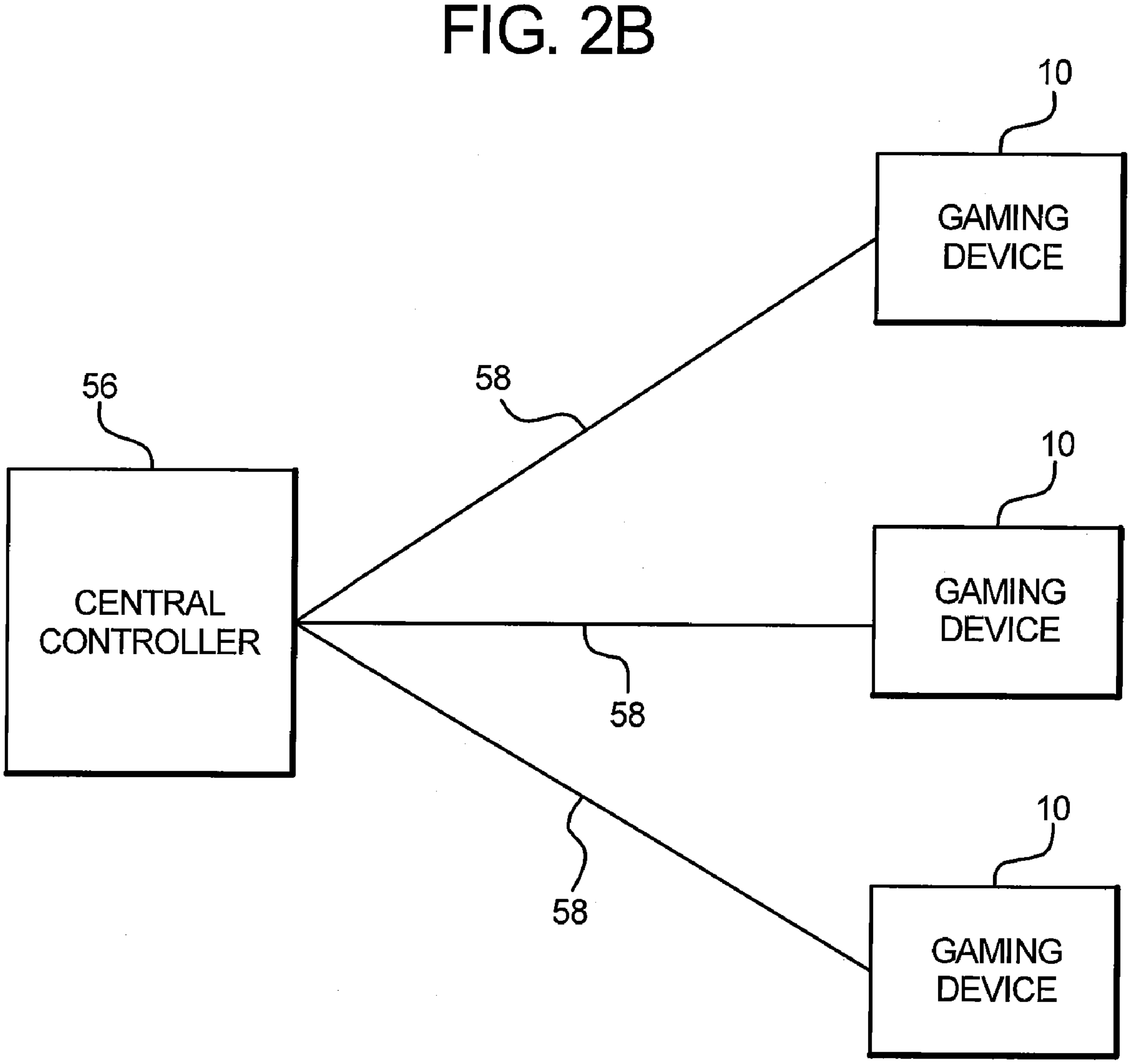

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Pai Gow Poker Game Embodiments

As mentioned above, the gaming system may be implemented in a number of different formats including, but not limited to: (1) a dedicated gaming machine, gaming device, or gaming systems wherein the computerized instructions for controlling any games are provided with the gaming machine or gaming device prior to delivery to a gaming establishment; (2) a changeable gaming machine, gaming device, or gaming system wherein the computerized instructions for controlling any games are downloadable to the gaming machine or gaming device through a data network after the gaming machine or gaming device is in a gaming establishment; (3) a multiplayer gaming table having physical cards, a live dealer, and a card tracking mechanism; (4) a multiplayer gaming table having multiple display devices, virtual cards and virtual chips; and (5) a multiplayer gaming table having multiple display devices, virtual cards, a human dealer and physical chips. Although the examples described below are implemented on a single player gaming machine having virtual cards and computerized instructions for controlling game play, it should be appreciated that the examples can be applied to any of the formats discussed above. For example, the Pai Gow Poker game can be applied to a "smart" multiplayer gaming table having a plurality of player positions, a dealer position, a physical deck of cards, and one or more card tracking mechanisms as shown in FIG. 1C. Also, the Pai Gow Poker game can be applied to a video-based multiplayer gaming table having a plurality of player displays.

Figure 3A:
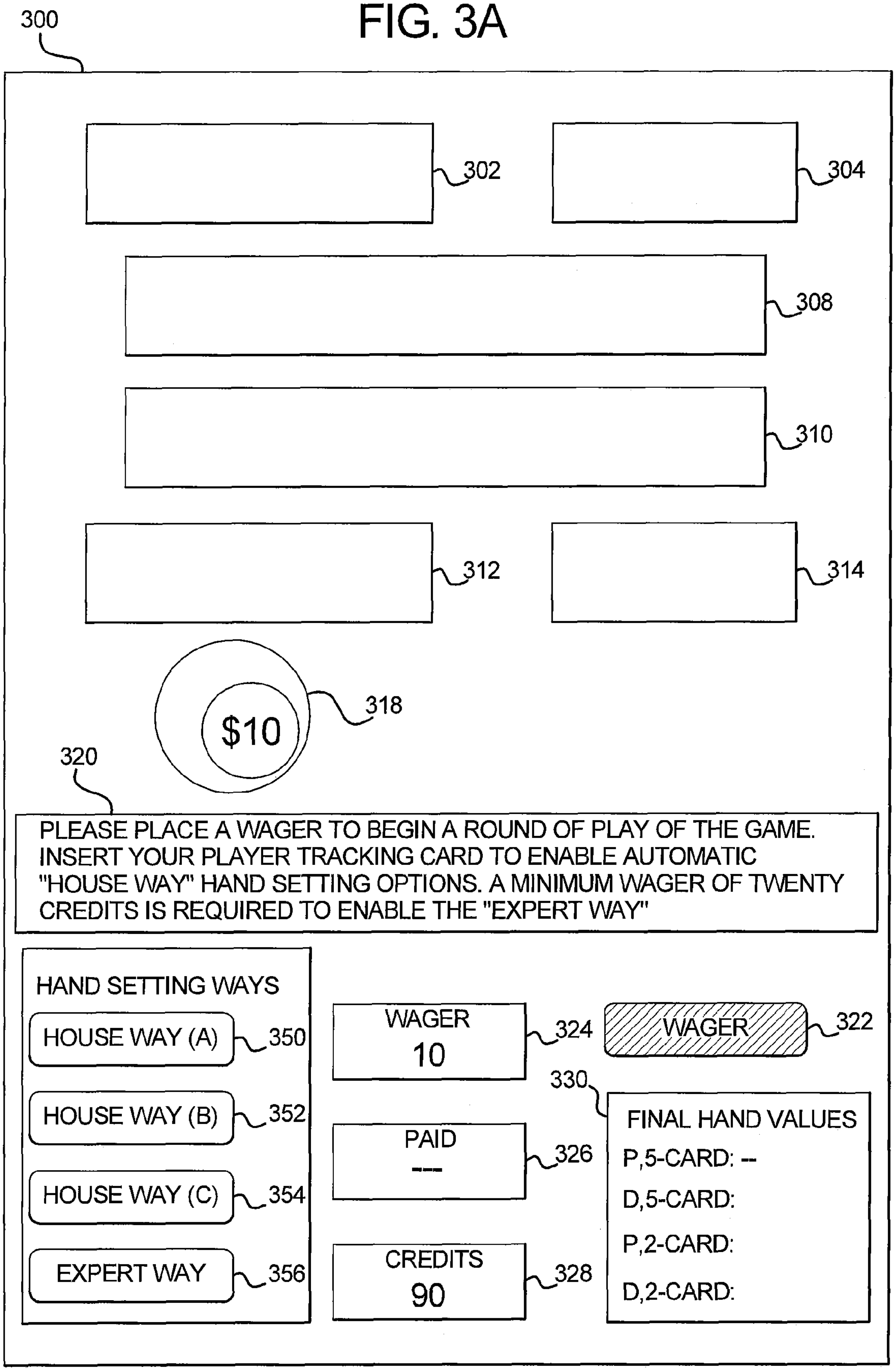
FIGS. 3A, 3B, 3C, 3D, 3E, 3F, 3G, 3H, 3I and 3J are illustrations of screen displays for first and second rounds of the game, of one embodiment.

In one embodiment utilizing a single player gaming machine, the gaming system provides a Pai Gow Poker game and enables a player to select a set of automatic player hand setting rules. FIGS. 3A through 3J illustrate two rounds of play of one example game of the present disclosure. As shown in FIG. 3A, in an embodiment, the gaming system 300 incorporates a display device that includes several elements. These elements include a five-card dealer hand area 302 and a two-card dealer hand area 304. The gaming system 300 also includes a dealer card area 308 and a player card area 310. Similar to the five-card and two-card areas for the dealer, the gaming system 300 also displays a five-card player hand area 312 and a two-card player hand area 314. The gaming system 300 includes a wager area 318, a message display 320, a wager input 322, a wager display 324, an award display 326, a credits display 328, and a final hand value display 330. The display device also includes an area that includes inputs for various automatic hand setting inputs. In this example, the automatic hand setting inputs include a "House-Way (A)" input 350, a "House-Way (B)" input 352, a "House-Way (C)" input 354, and an "Expert-Way" input 356. It should be appreciated that the gaming system 300 may include any number of suitable displays and/or inputs to facilitate play of the game.

As shown in FIG. 3A, the gaming system 300 prompts the player to place a wager to begin a round of play of the game, as indicated in message display 320. In this embodiment, the gaming system 300 also prompts the player to insert a player tracking card to enable the automatic "House-Way" hand setting options (i.e., "House-Way (A)" input 350, "House-Way (B)" input 352, and "House-Way (C)" input 354"), as indicated in message display 320. It should be appreciated that the different "House-Way" rules may include "House-Way" rules from different gaming establishments or casinos, or may reflect "House-Way" rules according to the gaming regulations from different geographic regions (e.g., Las Vegas or Atlantic City rules). Therefore, a player may select "House-Way" hand setting rules that they are most accustomed to playing with, or "House-Way" rules that the player believes gives them a greater advantage.

As also indicated in message display 320, the gaming system 300 indicates that a minimum wager of twenty credits is required to activate the "Expert-Way" automatic hand setting option. It should be appreciated that in other embodiments, a minimum wager may not be required to activate the "Expert-Way" automatic hand setting option. As shown in FIG. 3A, the player has elected to place a ten credit wager on this round of play of the game, as indicated by the activated wager input 322, the wager display 324, and the credit token in the wager area 318. After the player elects to place the ten credit wager, the gaming system 300 causes the credits display 328 to be reduced from an initial credit amount of one-hundred credits (not shown), down to ninety credits.

Figure 3B:
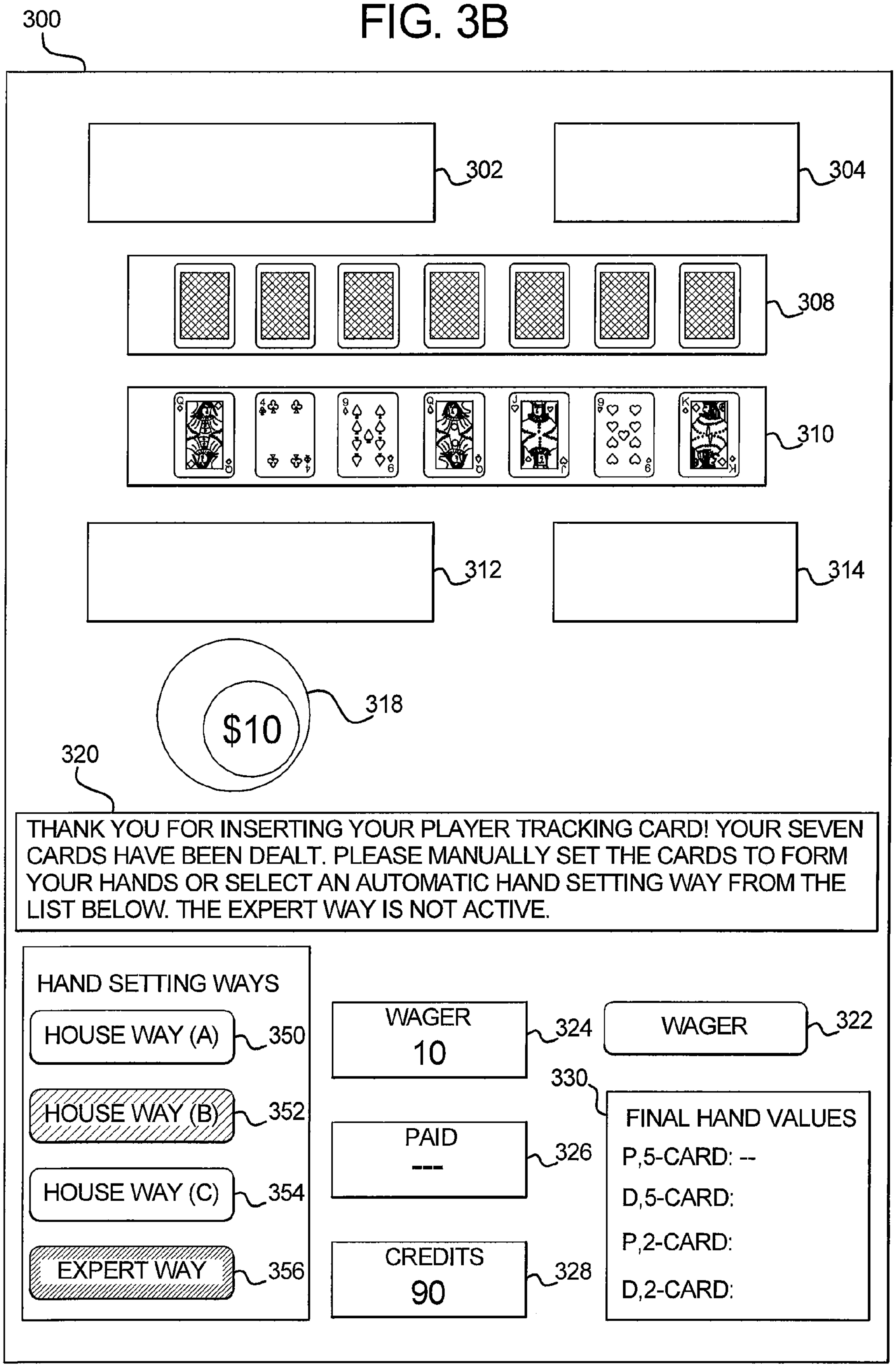

In this embodiment, the gaming system 300 deals a plurality of player cards into the player card area 310, and a plurality of cards into the dealer card area 308. The cards are dealt from a single virtual conventional deck of fifty-three cards including a Joker. The Joker functions as a limited wild card and has limited functionality. As discussed above, the Joker may be used to complete a high ranking poker hand (e.g., a Royal Straight Flush). However, if the Joker is not able to complete a high ranking hand, the Joker defaults to an Ace. In other embodiments, two or more decks of virtual cards may be used, and the decks may contain no Joker card or more than one Joker card. As mentioned above, the number of cards in a deck and the number of decks used may vary. As shown in FIG. 3B, gaming system 300 deals seven dealer cards face-down in the dealer card area 308. The gaming system 300 also deals seven player cards face-up in the player card area 310, as also indicated in the message display 320. In this example round of play of the game, the seven player cards are revealed and include Q♦4♣9♠J♠J♥9♥, K♦. The message display 320 indicates that, for the current round of play of the game, the player has inserted a player tracking card. Therefore, the "House-Way (A)" input 350, the "House-Way (B)" input 352, and the "House-Way (C)" input 354 are active. However, because the player's wager was less than the minimum twenty credits required to activate the "Expert-Way" automatic card setting method the "Expert-Way" input 356 is not active. The gaming system 300 prompts the player to either manually set the seven player cards to form the five-card player hand and the two-card player hand, or select one of the "House-Way" automatic card setting methods. In this example round of play of the game, the player has selected the "House-Way (B)" method, as indicated by the activated "House-Way (B)" input 352.

Figure 3C:
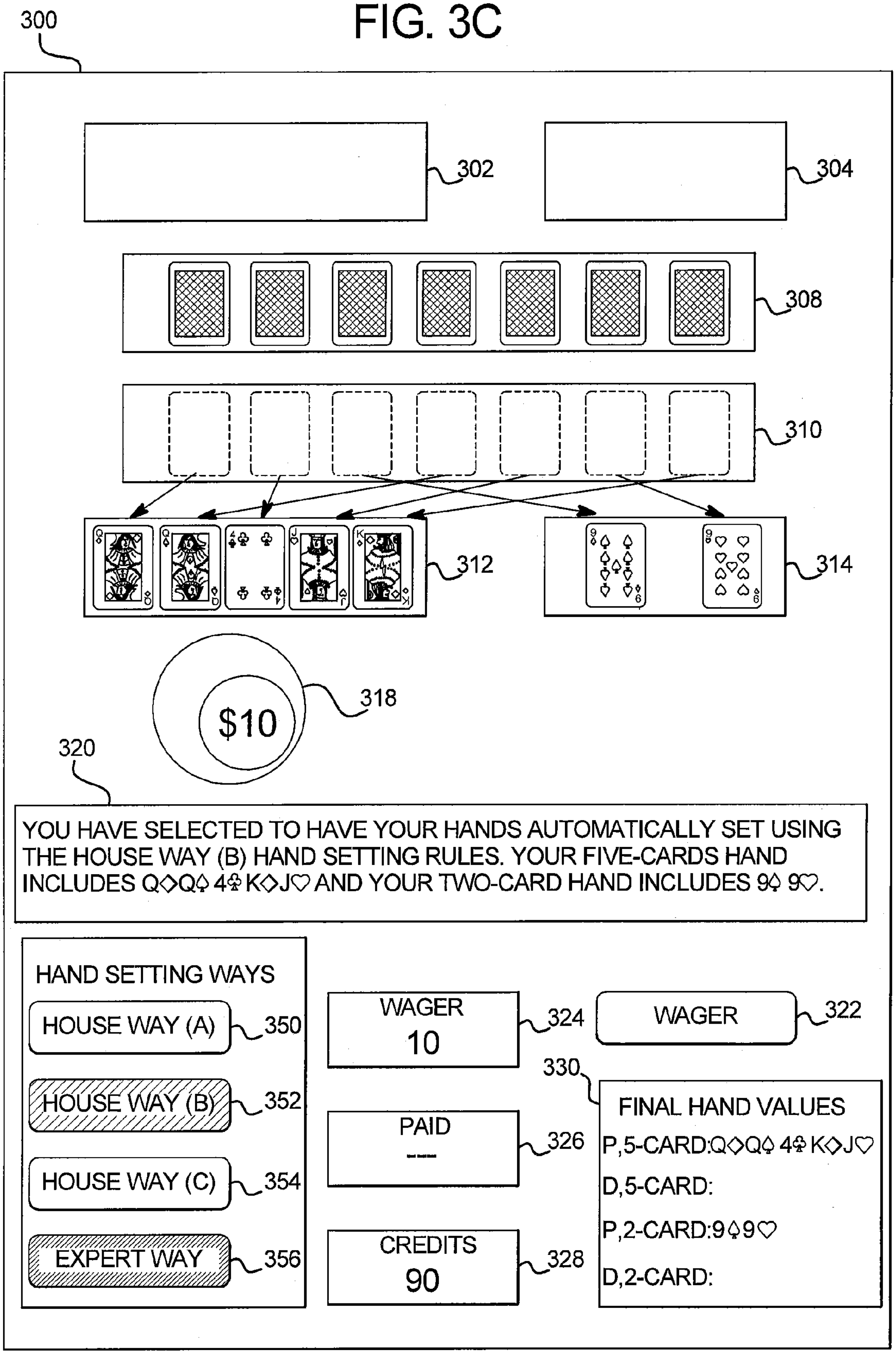

As shown in FIG. 3C, the gaming system 300 causes the seven player cards to be moved to the five-card player hand area 312 and the two-card player hand area 314. Under the "House-Way (B)" automatic hand setting rule set, if the seven dealer cards include two pairs, the gaming system 300 must place both of the pairs in the five-card player hand except in the following circumstances:

(a) if one of the pairs is sevens or greater and there are no singleton Aces (i.e., a non-paired Ace), then place the higher pair in the five-card dealer hand and the lower pair in the two-card dealer hand;

(b) if one of the pairs is Jacks or better, if the other of the pairs is sixes or better, and there is a singleton Ace, then place the higher pair in the five-card dealer hand and the lower pair in the two-card dealer hand; and (c) if one of the pairs is a pair of Aces, then place the pair of Aces in the five-card dealer hand and the lower pair in the two-card dealer hand.

Because the seven player cards include a pair of Queens (which are higher than a pair of Sevens) and there are no singleton Aces, the second pair of Nines must be placed in the two-card player hand. Therefore, the final five-card player hand includes Q♦Q♠4♣J♥K♦, and the final two-card player hand includes 9♠9♥.

Figure 3D:
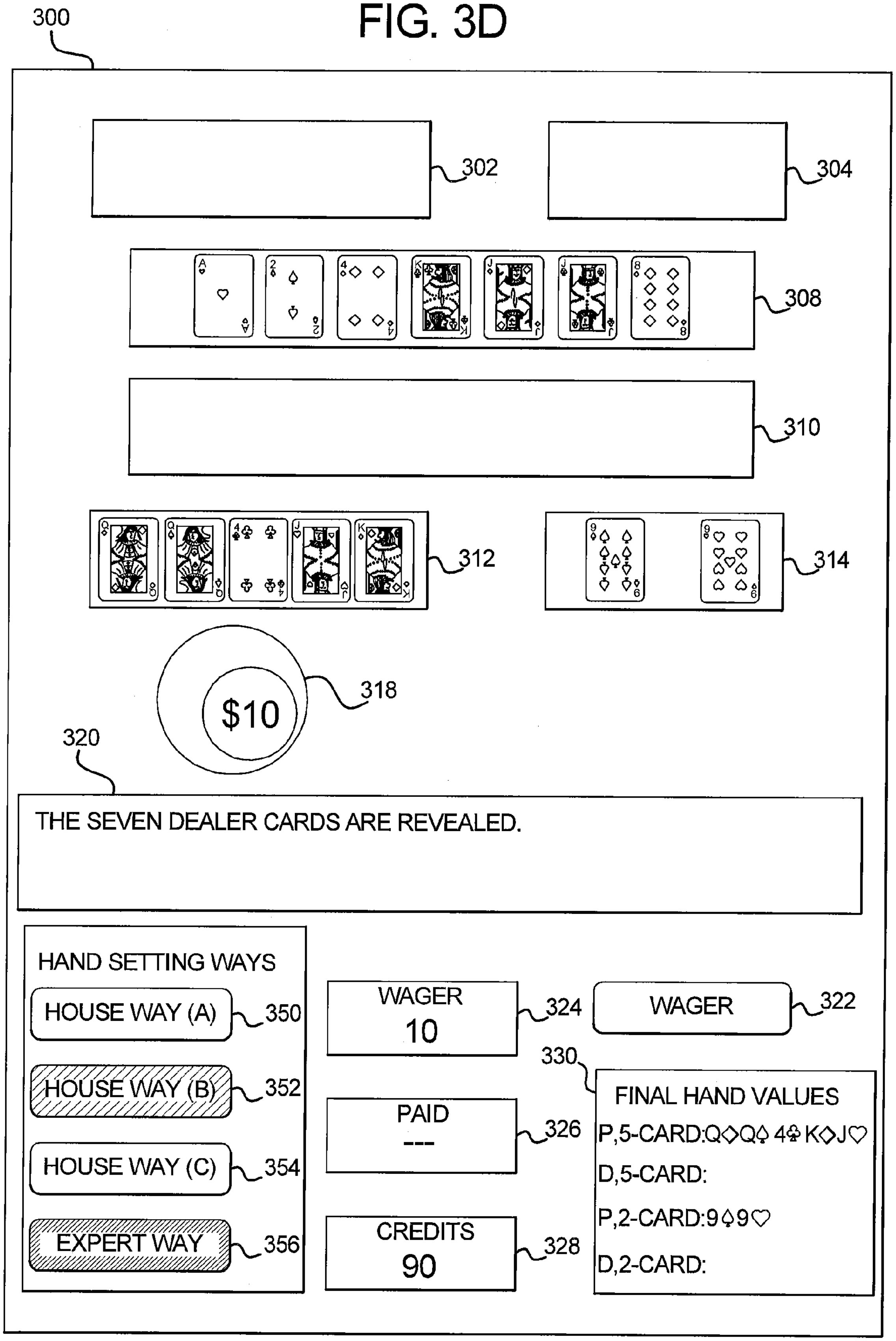
Figure 3E:
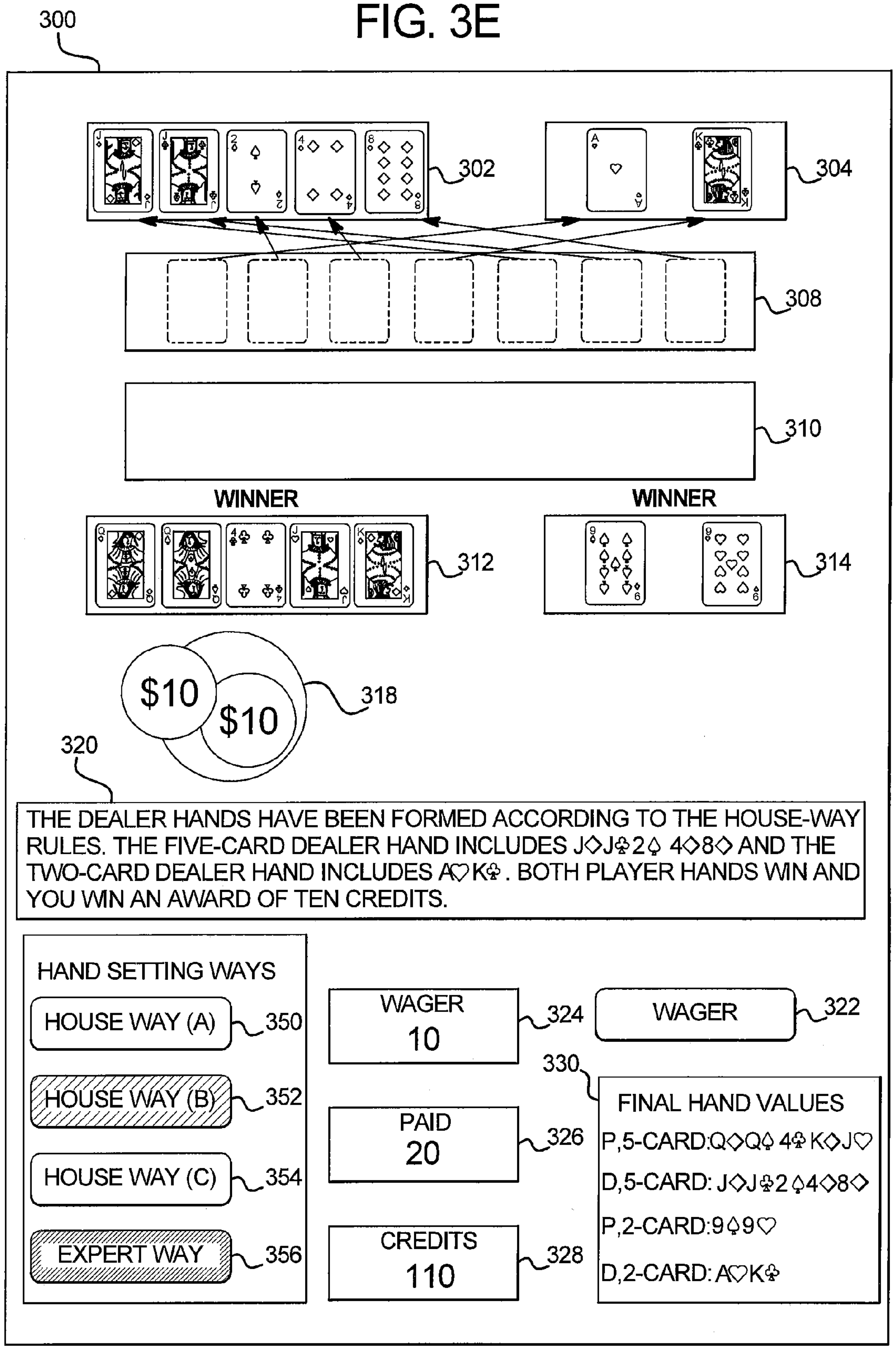

As shown in FIG. 3D, the seven dealer cards are revealed and include A♥2♠4♦K♣J♦J♣8♦, as indicated in the dealer card area 308. As shown in FIG. 3E, the gaming system 300 causes the seven dealer cards to be moved to the five-card dealer hand area 302 and the two-card dealer hand area 304 according to the "House-Way" rules. It should be appreciated that the "House-Way" rules for arranging the cards in the five-card dealer hand and the two-card dealer hand may be one of the "House-Way (A)" rules, the "House-Way (B)" rules, the "House-Way (C)" rules, or a different set of "House-Way" rules that can only be used by the gaming system (i.e., that cannot be used by a player) for setting of the dealer hands. In certain embodiments, the system enables the casino operator to select a specific House-Way from a plurality of House-Ways to be used in the game by the dealer and the player. In another embodiment, the player has access to either a single House-Way or to an Expert Way. In another embodiment, the casino operator can enable or disable alternate hand setting options for all players, for example, changing said selection settings when the device is being used for tournament play. In this example round of play of the game, the "House-Way" rules used to set the dealer hands provide that if the seven dealer cards include only one pair (e.g., J♦J♣), the dealer must place this pair in the five-card dealer hand, and place the next two highest value cards (A♥K♣) in the two-card dealer hand. Accordingly, the gaming device 300 causes the J♦J♠2♣4♦8♦ to be moved to the five-card dealer hand area 302, and causes the A♥K♣ to be moved to the two-card dealer hand area 304, as also indicated in message display 320. The gaming system 300 then evaluates the final player hands and final dealer hands to determine a winner, as also indicated in the final hand value display 330. In this example round of play of the game the five-card player hand (i.e., Q♦Q♠K♦J♥4♣) beats the five-card dealer hand (i.e., J♦J♣8♦4♦2♠), and the two-card player hand (i.e., 9♠9) beats the two-card dealer hand (i.e., A♥K♣). Because both of the player hands have beaten the respective dealer hands, the player wins the round of play of the game, as indicated in message display 320. The gaming system 300 displays an award of ten credits, as indicated in the award display 326 and the message display 320. The gaming system 300 also updates the total player credits from ninety to one-hundred and ten credits, as indicated in the credits display 328. This ends this example round of play of the game.

Figure 3F:
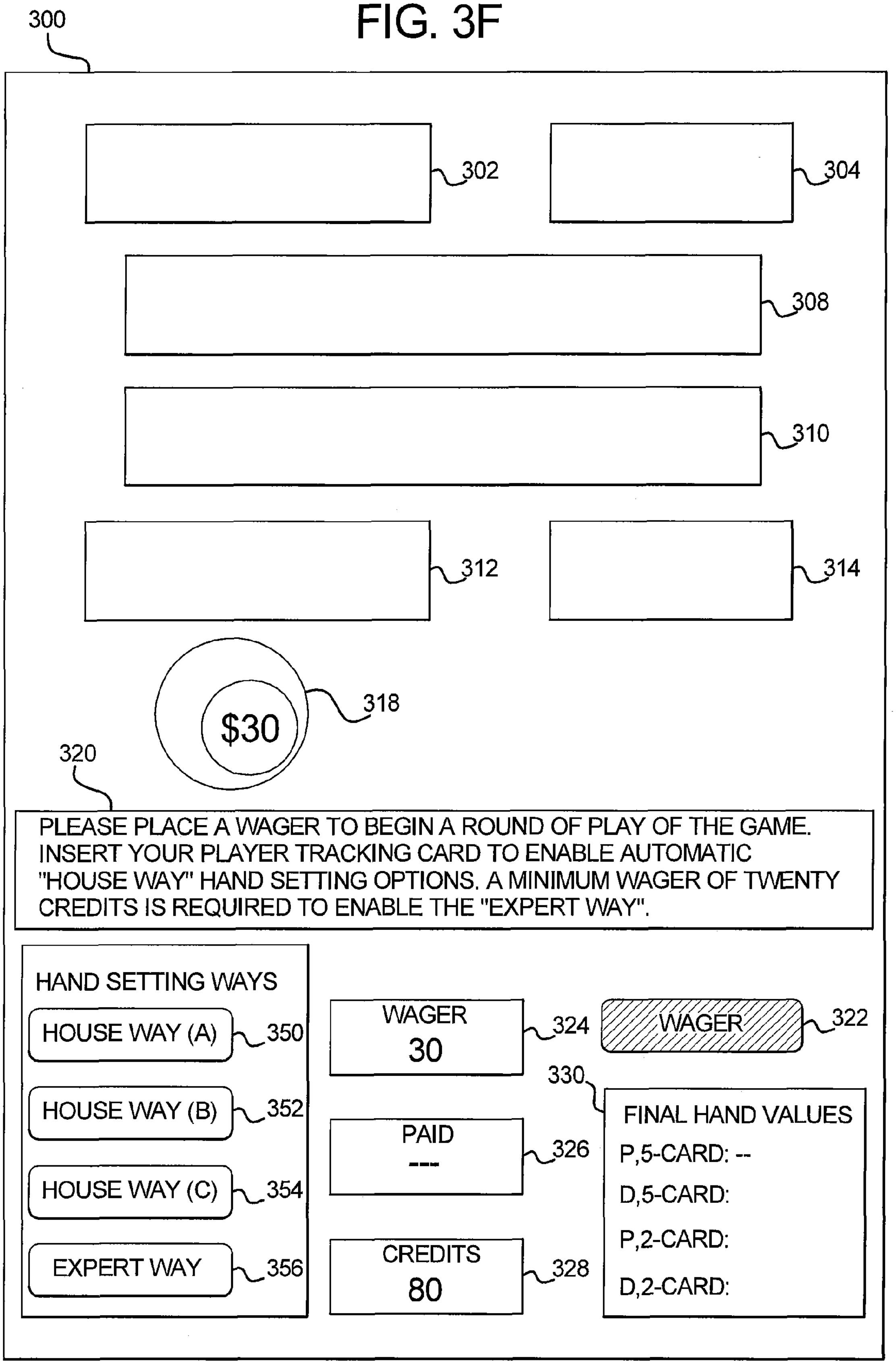

FIGS. 3F to 3J illustrate a second round of play of the game where the player has removed the player tracking card and also placed a high enough wager to activate the "Expert-Way" automatic card setting option. As shown in FIG. 3F, the gaming system 300 prompts the player to place a wager and to insert a player tracking card to enable the automatic "House-Way" hand setting options (i.e., "House-Way (A)" input 350, "House-Way (B)" input 352, and "House-Way (C)" input 354), as indicated in message display 320. As also indicated in message display 320, the gaming system 300 indicates that a minimum wager of twenty credits is required to activate the "Expert-Way" automatic hand setting option.

Figure 3G:
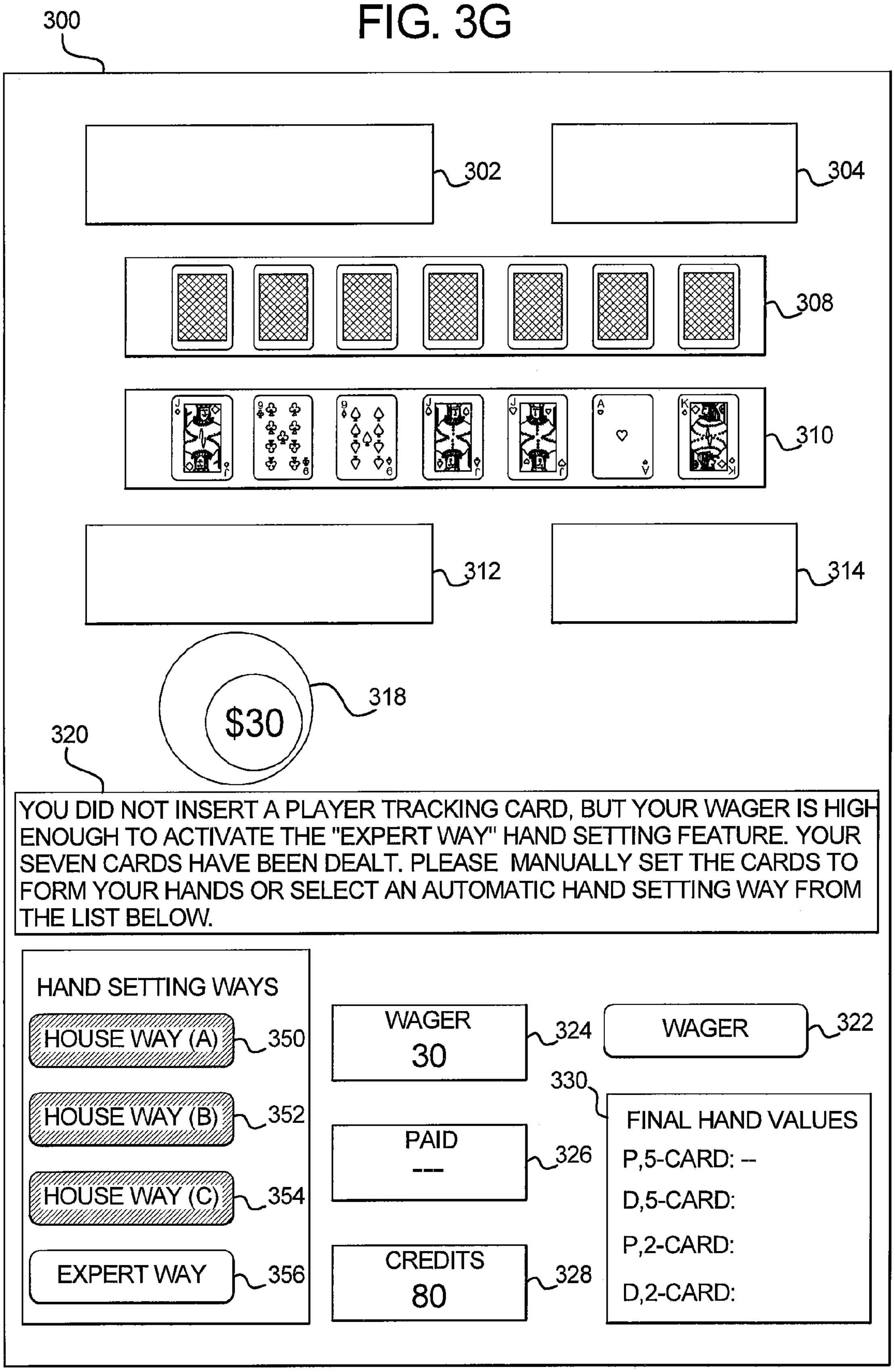

As shown in FIG. 3G, in this round of play of the game, the player has not inserted (or has previously removed) the player tracking card. Accordingly, the "House-Way (A)" input 350, the "House-Way (B)" input 352, and the "House-Way (C)" input 354 are deactivated. However, because the player placed a thirty credit wager, as indicated in the wager display 324, the player has met the minimum wagering requirements to activate the "Expert-Way" automatic card setting option. The gaming system 300 deals seven player cards face-up in the player card area 310 and deals seven dealer cards face-down in the dealer card area 308. The gaming system 300 then prompts the player to manually set the cards for the five-card player hand and the two-card player hand, or select from the available automatic hand setting ways. As mentioned above, in this example round of play of the game, the only available automatic player hand setting method is the "Expert-Way" method.

Figure 3H:
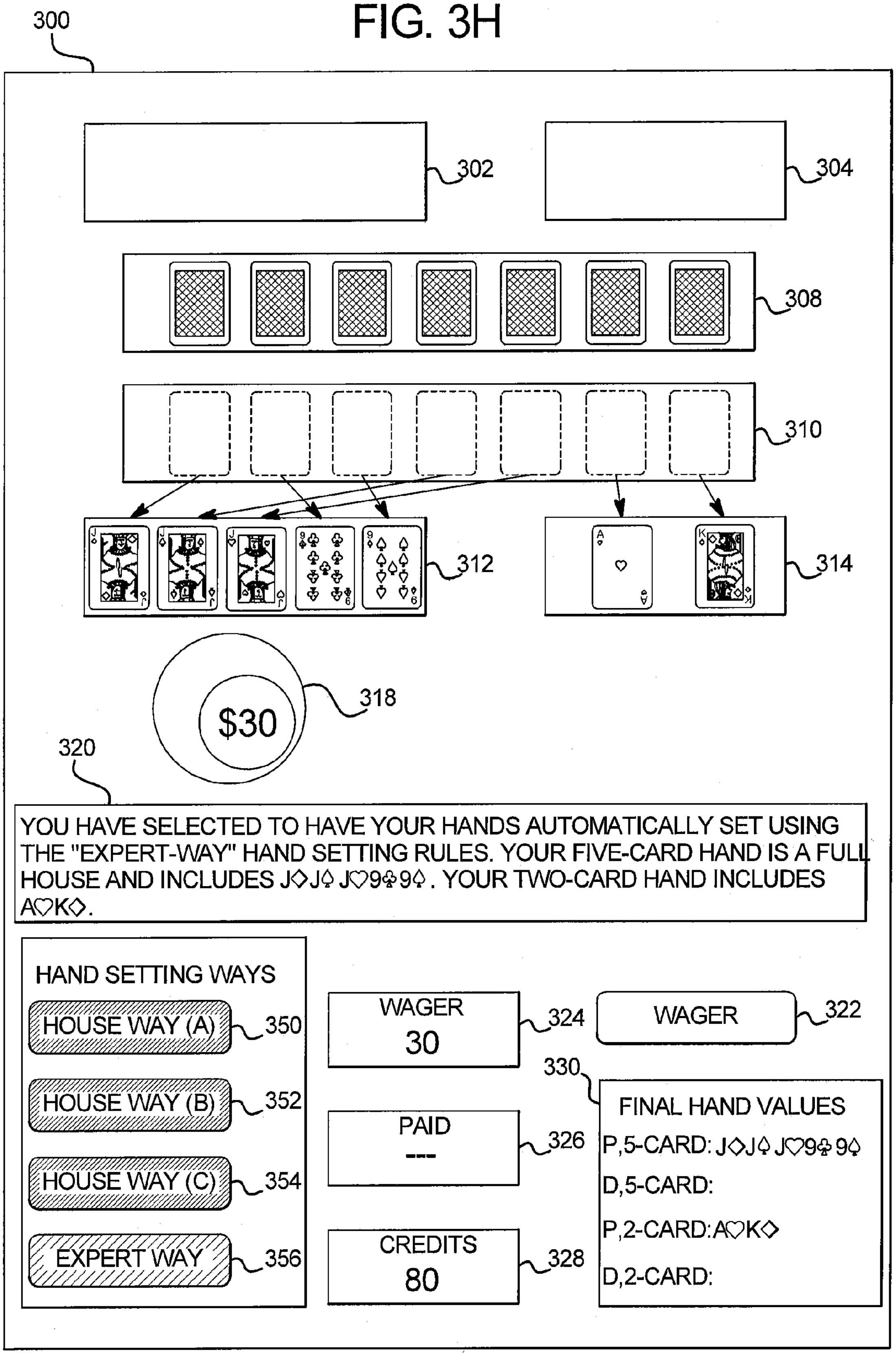
Figure 3I:
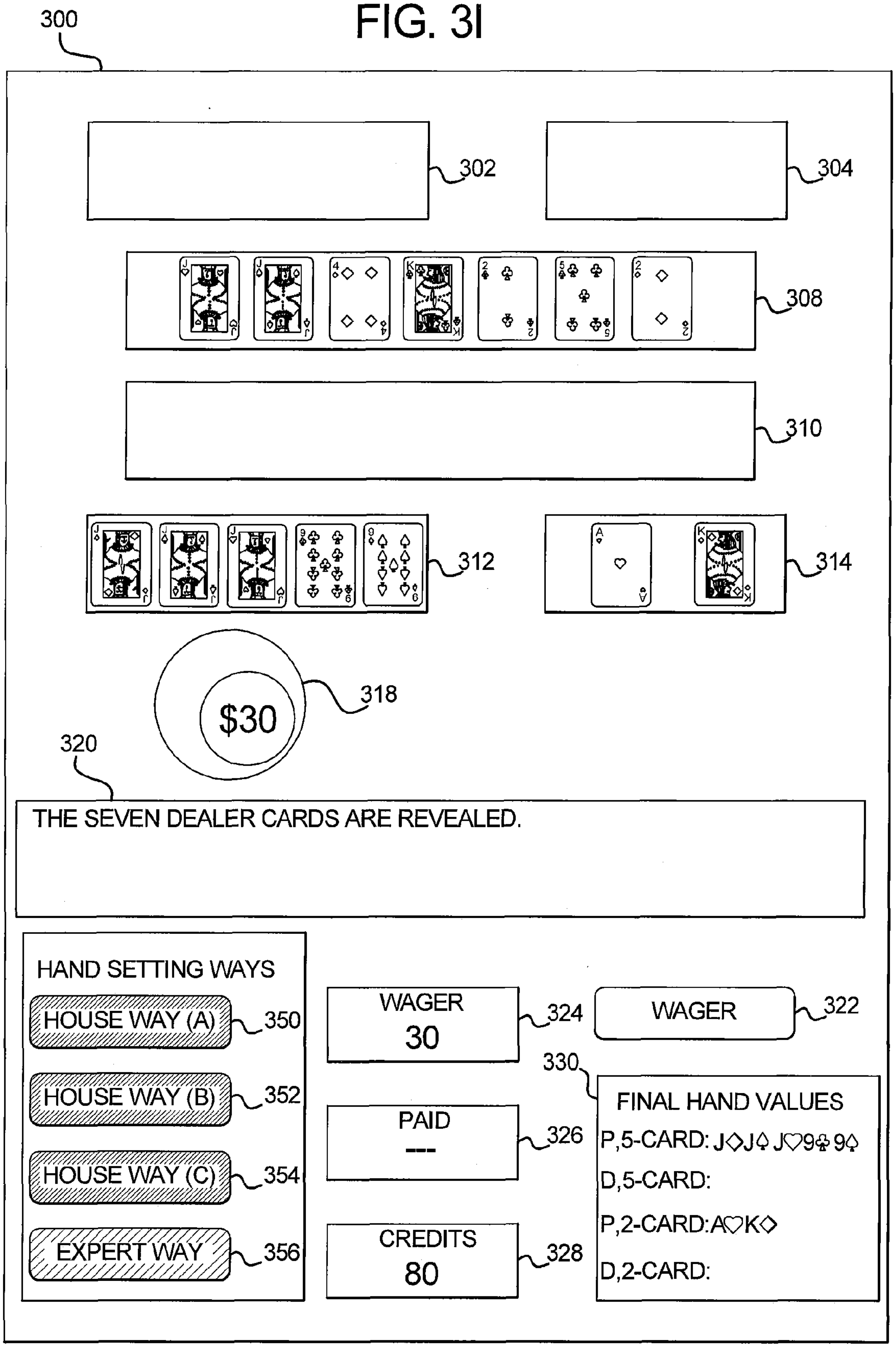

As shown in FIG. 3H, the player has selected to use the use the "Expert-Way" method by activating the "Expert-Way" input 356. The gaming system 300 moves the seven player cards from the player card area 310 to the five-card player hand area 312 and the two-card player hand area 314 according to the "Expert-Way" rule set. In this example embodiment, the "Expert-Way" rule set requires that if the seven player cards include a Full House, the dealer must split the Full House into a Three-Of-A-Kind and a pair, with the Three-Of-A-Kind being placed in the five-card dealer hand. This rule has the following exceptions: (a) if the Full House include a pair of twos, the Full House does not need to be split up; and (b) if the remaining two cards of the seven dealer cards are an Ace and a King, the Full House does not need to be split up. In this example round of play of the game, because the seven player cards include a full house (i.e., J♦J♠J♥9♠9♣) and the remaining two cards include A♥K♦, the second exception to the rule has been met. Accordingly, the gaming device 300 causes the five cards forming the Full House to be moved to the five-card player hand area 312 and the remaining Ace and King to be moved to the two-card player hand area 314, as also indicated in message display 320 and final hand value display 330.

Figure 3J:
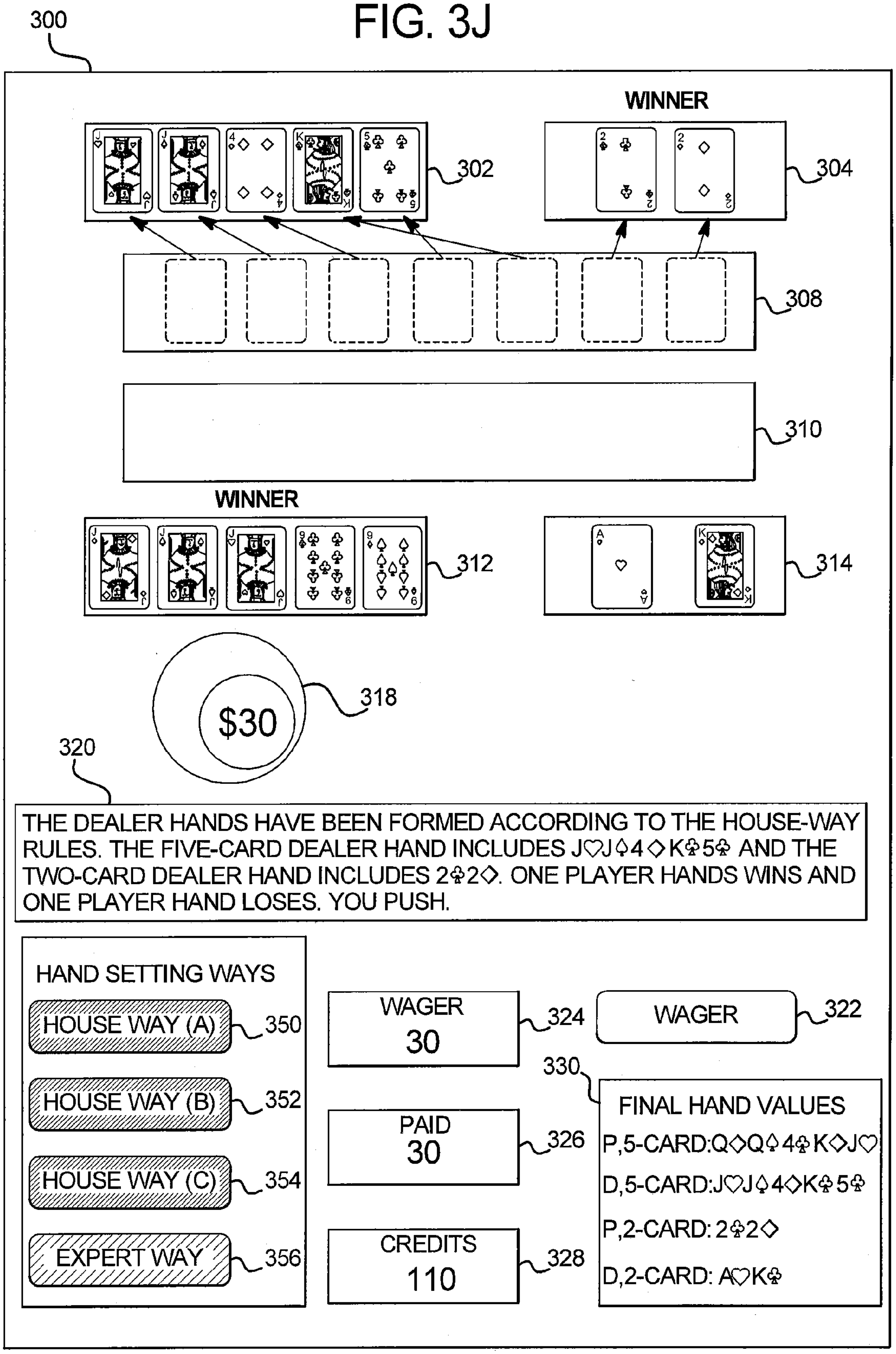

As shown in FIG. 31, the gaming system 300 reveals the seven dealer cards in the dealer card area 308. The dealer cards include J♥J♠4♦K♣2♣5♣2♦. Therefore, the dealer cards include two pairs. As shown in FIG. 3J, the gaming system caused the seven dealer cards to move to the five-card dealer hand area 302 and the two-card dealer hand area 304 according to the "House-Way" rules. As mentioned above, under the "House-Way" rule set if the seven dealer cards include two pairs, the dealer must place both of the pairs in the five-card dealer hand except in three circumstances. In this example round of play of the game, because one of the pairs includes Sevens or greater (i.e., J♥J♠) and there are no singleton Aces, the third exception to the general rule applies, and the gaming system 300 must place the higher pair in the five-card dealer hand area 302 and the lower pair (i.e., 2♠2♦) in the two-card dealer hand area 304. Therefore, the gaming system 300 causes the J♥J♣4♦K♣5♣ to be moved to the five-card dealer hand area 302 to form the five-card dealer hand, and causes the 2♣2♦ to be moved to the two-card dealer hand area 304 to form the two-card dealer hand, as also indicated by message display 320 and final hand value display 330.

The gaming system 300 then evaluates the final player hands and final dealer hands to determine a winner. In this example round of play of the game, the five-card player hand (i.e., J♦J♠J♥9♠9♣) has a rank of Full House and beats the five-card dealer hand (i.e., J♥J♠4♦K♣5♣) which only has a rank of One Pair. However, because the two-card player hand (i.e., A♥K♦) loses to the two-card dealer hand (i.e., 2♣2♦), the player pushes the round of play of the game, as indicated in message display 320. The gaming system 300 refunds the player's wager and caused the display device to update the total player credits from eighty to one-hundred and ten credits, as indicated in the credits display 328. This ends this example round of play of the game.

Figure 4A:
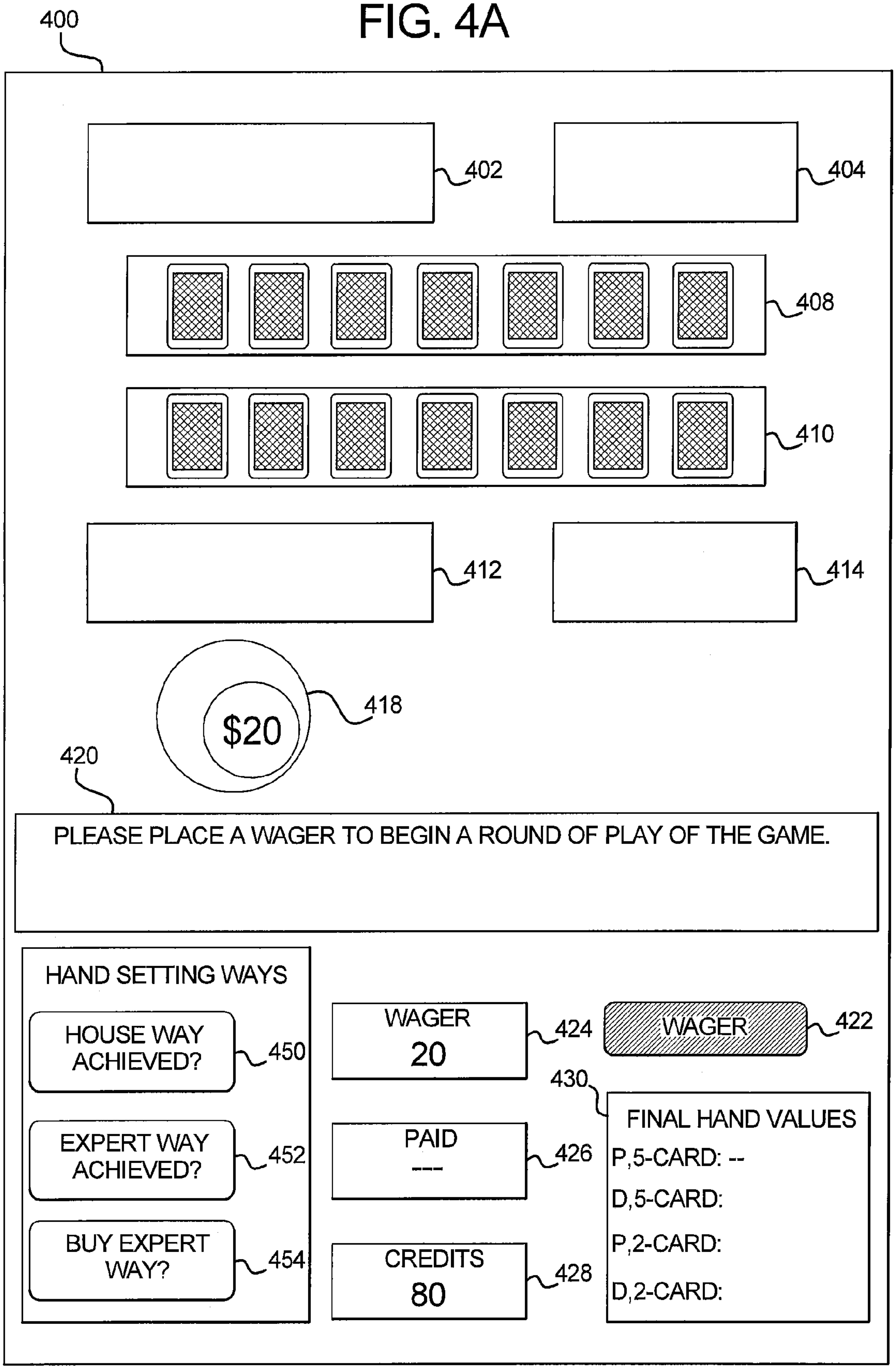
FIGS. 4A, 4B, 4C, 4D, 4E and 4F are illustrations of screen displays for a round of play of the game, of one embodiment.

FIGS. 4A through 4E illustrate a round of play of a game in one embodiment of the present disclosure. As shown in FIG. 4A, in an embodiment, the gaming system 400 incorporates a display device that includes several elements that are similar to the display elements described above with respect to FIGS. 3A through 3J. These elements include a five-card dealer hand area 402 and a two-card dealer hand area 404. The gaming system 400 also includes a dealer card area 408 and a player card area 410. Similar to the five-card and two-card areas for the dealer, the gaming system 400 also displays a five-card player hand area 412 and a two-card player hand area 414. The gaming system 400 includes a wager area 418, a message display 420, a wager input 422, a wager display 424, an award display 426, a credits display 428, and a final hand value display 430. The display device also includes indicators 450 and 452 that indicate if the player's manual card setting strategy matches the "House-Way" and/or the "Expert-Way" card setting rules, respectively. The display device also includes a buy "Expert-Way" input 454 to enable the player to optionally purchase the "Expert-Way"automatic hand setting method. It should be appreciated that the gaming system 400 may include any number of suitable displays and/or inputs to facilitate play of the game.

Figure 4B:
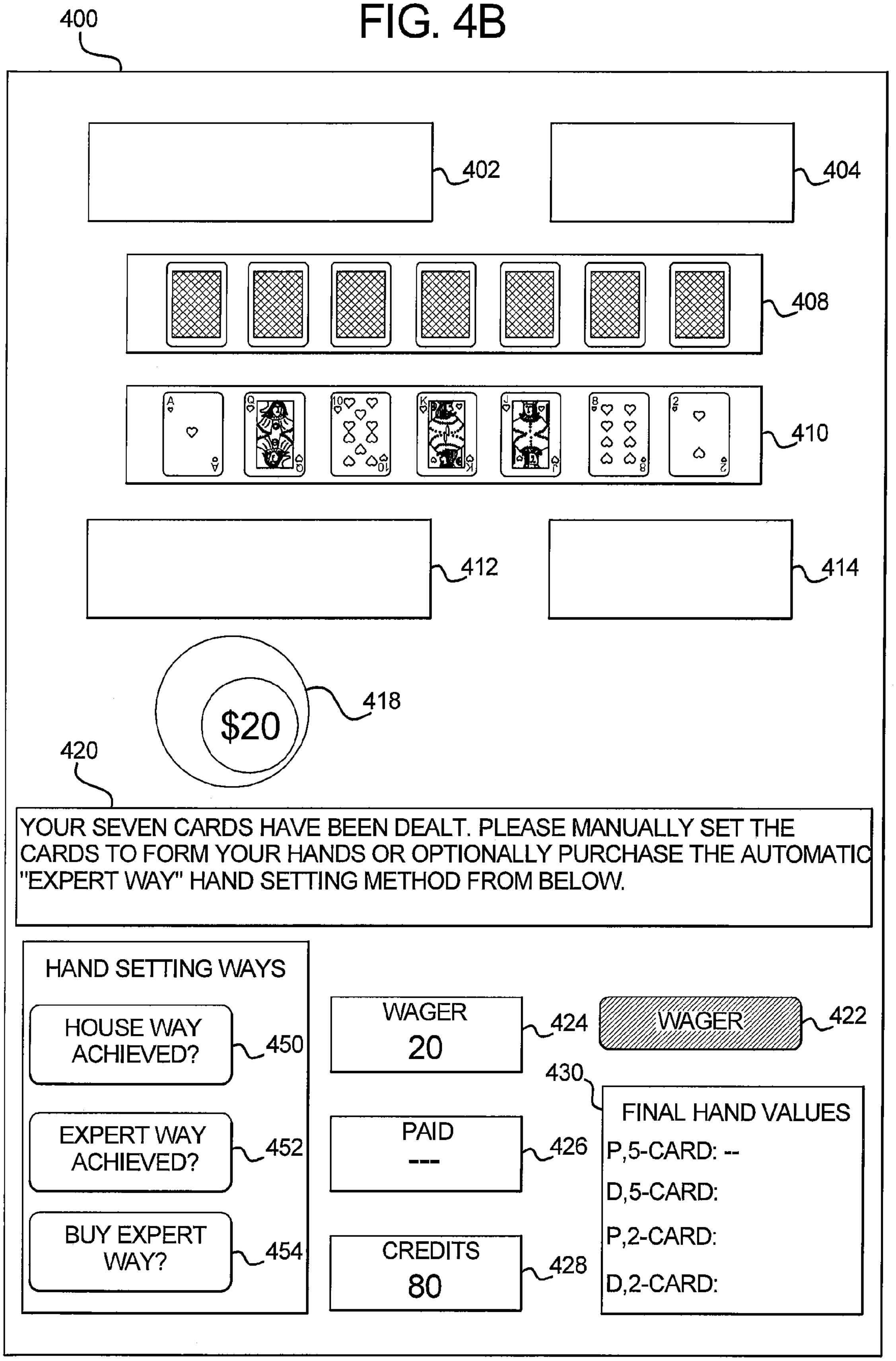

As shown in FIG. 4A, the gaming system 400 prompts the player to place a wager to begin a round of play of the game, as indicated in message display 420. In this example round of play of the game, the player wagers twenty credits, as indicated in the wager display 424 and by the activated wager input 422. The gaming system 400 causes the total player credits to be reduced from one-hundred credits (not shown) to eighty credits. As shown in FIG. 4B, the gaming system 400 causes seven player cards to be dealt face-up in the player card area 410, and causes seven dealer cards to be dealt face-down in the dealer card area 408. As shown in the player card area 410, the seven player cards include A♥Q♥10♥K♥J♥8♥2♥. Therefore, the seven player cards include a seven card Flush and also include five cards that could be used to form a Royal Straight Flush (i.e., A♥K♥Q♥J♥10♥). As shown in FIG. 4B, the gaming system 400 prompts the player to either manually set the seven player cards to form the five-card player hand and the two-card player hand or optionally purchase the "Expert-Way" hand setting method. In an alternate embodiment, there is no bet required for Expert-Way functionality.

In one embodiment, the player can place an optional side wager or secondary wager. If the player places the secondary wager, the dealer or the gaming system determines the highest ranking five card poker from the seven player cards. If this rank is one of a plurality of predefined high ranking hands, the player wins a bonus award. In the example round of play of the game described above with reference to FIGS. 4A and 4B, the player's highest five-card hand formed from the seven player cards is a Royal Straight Flush. Therefore, if the player had placed a side wager, the player would have won a bonus award even if the player did not win against the dealer in the primary Pai Gow Poker game. Generally, the amount of the side wager would be less that the amount of the primary wager. For example, the amount of the side wager could be one credit. In another multiplayer embodiment, the player can place a larger side wager (e.g., one credit for each player at the gaming table) and if any of the players achieve a five card hand of a sufficiently high rank, the player that placed the secondary wager would win a bonus award. Therefore, it is possible that the player could win multiple bonus awards if several of the other players at the table have high ranking poker hands. In one embodiment, the gaming system enables the Expert Way functionality for a player when the player has placed a wager on a side bet. In one variation, the wager is required to be of at least a certain amount or a certain amount relative to the player's main game wager.

Figure 4C:
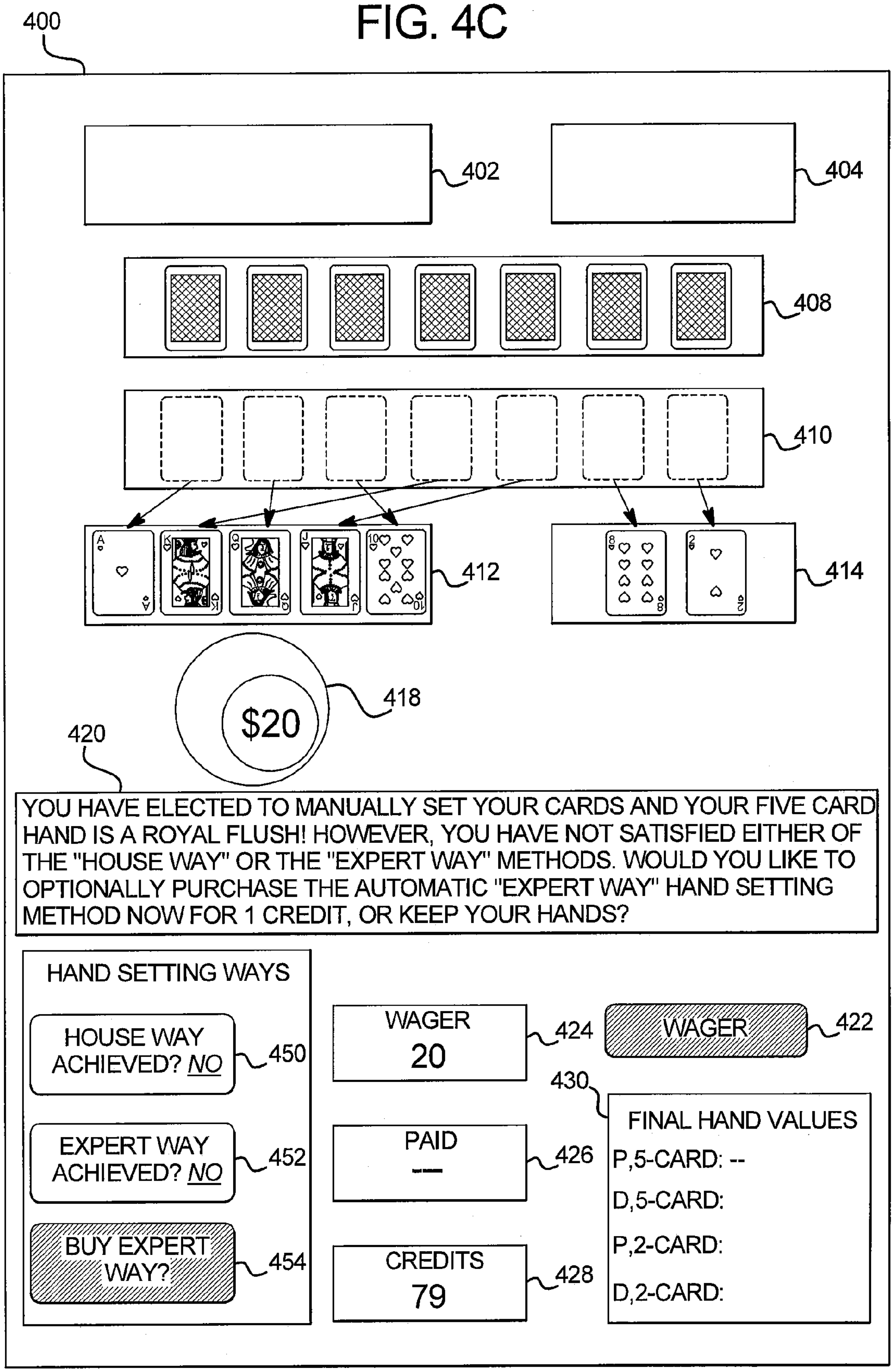

As shown in FIG. 4C, in this example round of play of the game, the player has opted to manually set the cards to form the five-card player hand and the two-card player hand, as indicated in message display. The player elected to form a Royal Straight Flush as the five-card dealer hand, and move the remaining 8♥ and 2♥ to the two-card player hand area 414. However, the player did not satisfy either the "House-Way" rules or the "Expert-Way" rules, as indicated by the "House-Way" indicator 450 and the "Expert-Way" indicator 452. Because the player's card setting choices have not satisfied either the "House-Way" rules or the "Expert-Way" rules, the gaming system 400 prompts the player to optionally purchase the automatic "Expert-Way" hand setting method to improve their hands, as indicated in message display 420.

This feature provides several options for the player. For a player who is not interested in setting his/her own cards, the "Expert-Way"purchase can be made in the beginning of the round of play of the game. For the beginner or intermediate players who are interested in manually setting their cards and/or learning Pai Gow Poker strategy, this optional purchase feature enables a player to first test their skill against the established card setting methods, and to get instant feedback from the gaming system as to whether their decisions were strategically sound. If, as in this example, the player receives an indication from the gaming system 400 that their decisions were not consistent with either the "House-Way" or "Expert- Way" methods, the player has the option to purchase a resetting of their hands and learn what the preferred or optimal strategy should have been. Therefore, this feature can be used as a learning tool or as a safety net by the player.

In this example round of play of the game, the player elects to purchase the "Expert-Way" automatic card resetting for one credit. It should be appreciated that the fee for the "Expert-Way" automatic card resetting may be greater than one credit, a percentage of the wager amount, or offered at no extra fee. In one embodiment, if the player selects to set their hand using the "Expert-Way" method, the player pays a commission where the commission is higher if the player has a winning hand. For example, if a normal game commission is 5%, a player may pay 6% if they have a winning hand. The "Expert-Way" automatic card resetting feature may be activated by another player qualifying condition, as discussed in further detail below.

Figure 4D:
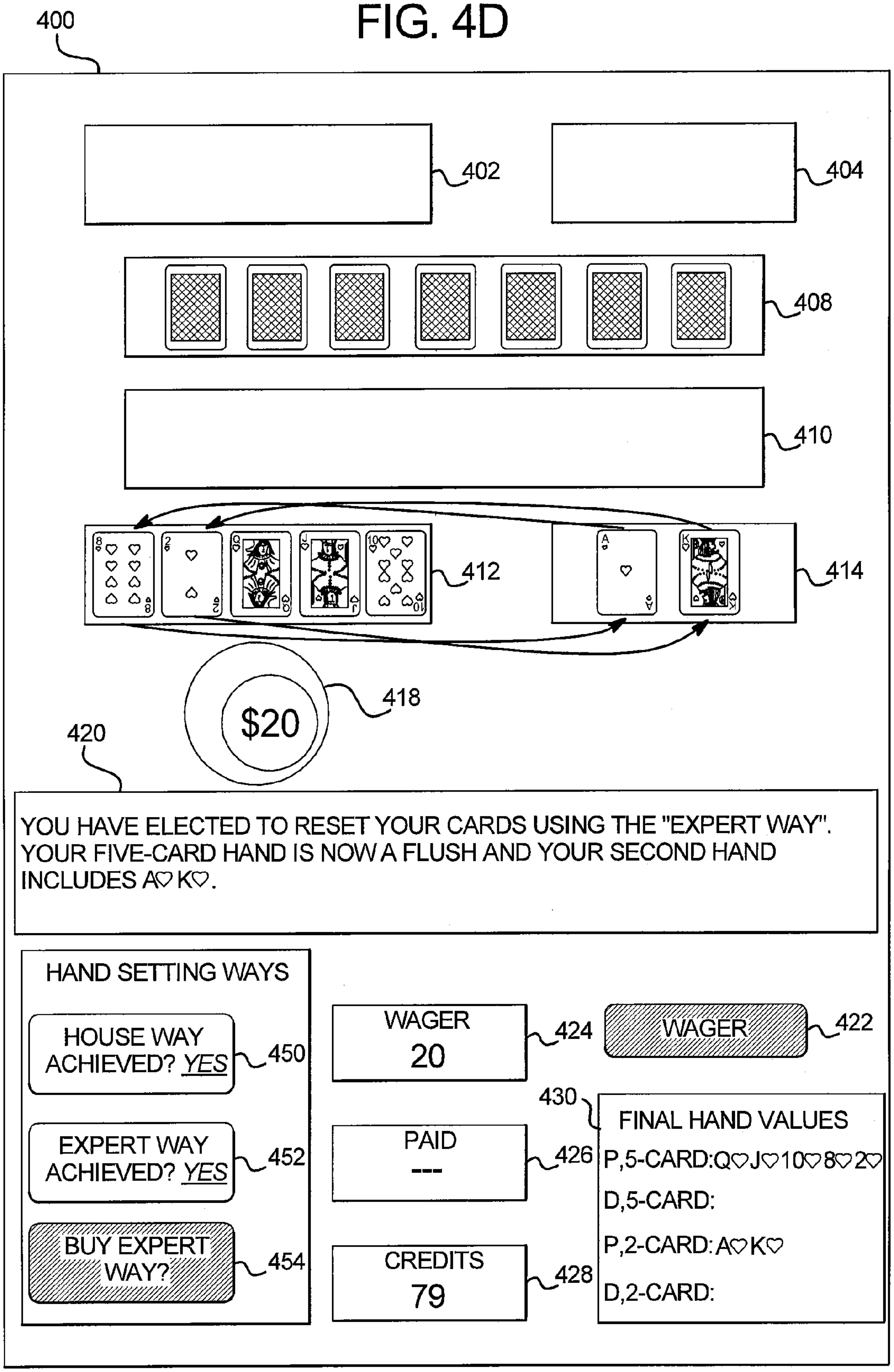

As shown in FIG. 4D, the player has elected to have their hands automatically reset by the gaming system 400 by activating the buy "Expert-Way" input 454. The gaming system 400 deducts one credit as the fee, and causes the credit display 428 to be reduced from eighty credits to seventy-nine credits. The gaming system 400 causes the five-card player hand and two-card player hand to be reset such that the A♥ and K♥ are moved from the five-card player hand area 412 to the two-card player hand area 414, and such that the 8♥ and 2♥ are moved from the two-card player hand area 414 to the five-card player hand area 412. Under this example embodiment, the "Expert-Way" rules dictate that if the seven player cards include a Royal Straight Flush (e.g., A♥, K♥, Q♥, J♥, 10♥, 6♥, 2♣), the player should form only a Straight or Flush in the five-card player hand if the two-card player hand can be made to include an Ace or higher. In this example round of play of the game, because the seven player cards are all Hearts, the Ace and King can be moved to the two-card player hand without sacrificing a Flush in the five-card player hand. Therefore, the player is able to retain a relatively high ranking final five-card player hand of a Flush (i.e., Q♥J♥10♥8♥2♥), and also drastically improve the value of the two-card player hand (i.e., from an 8♥2♥ combination to an A♥K♥ combination).

Figure 4E:
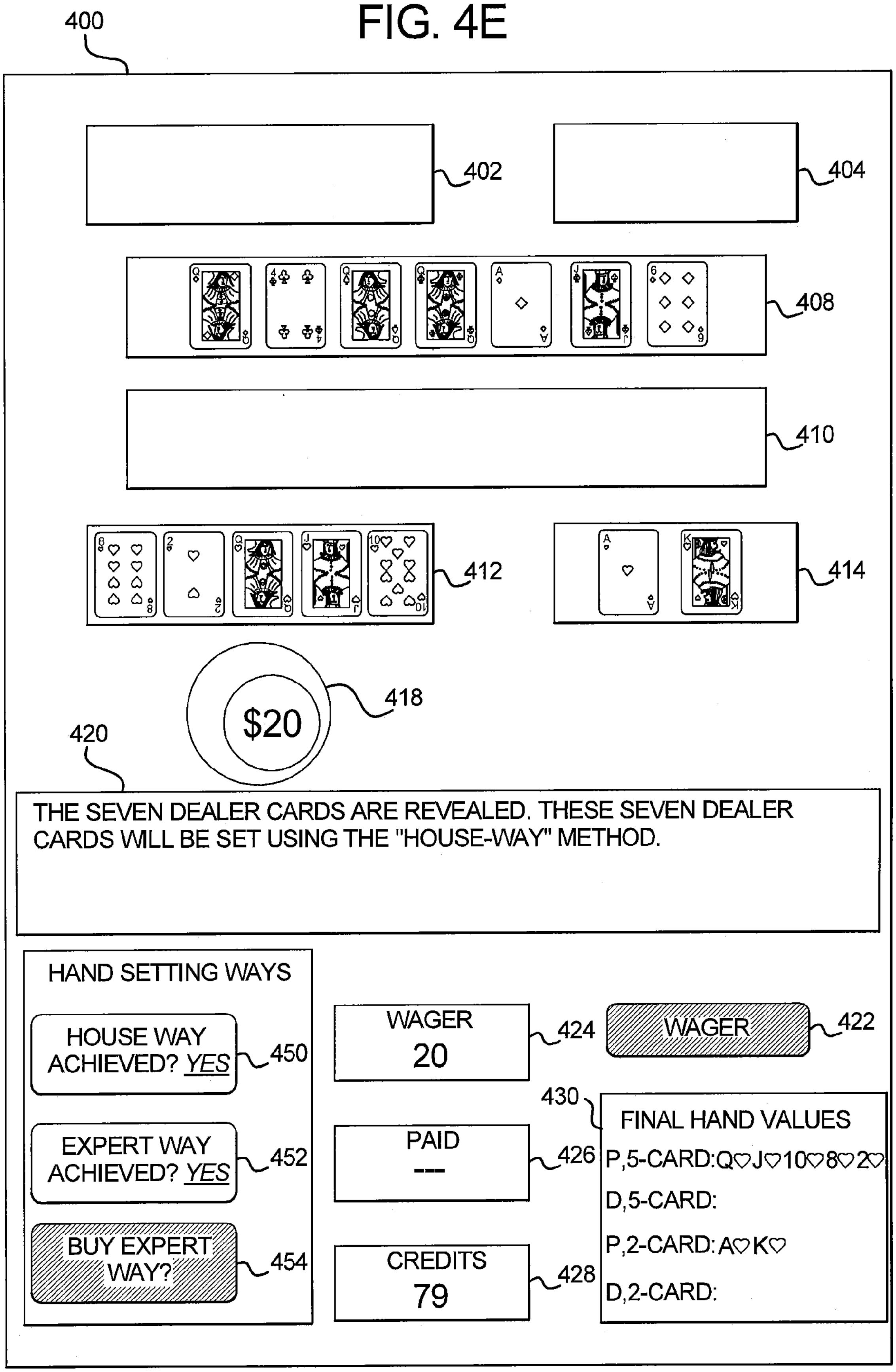
Figure 4F:
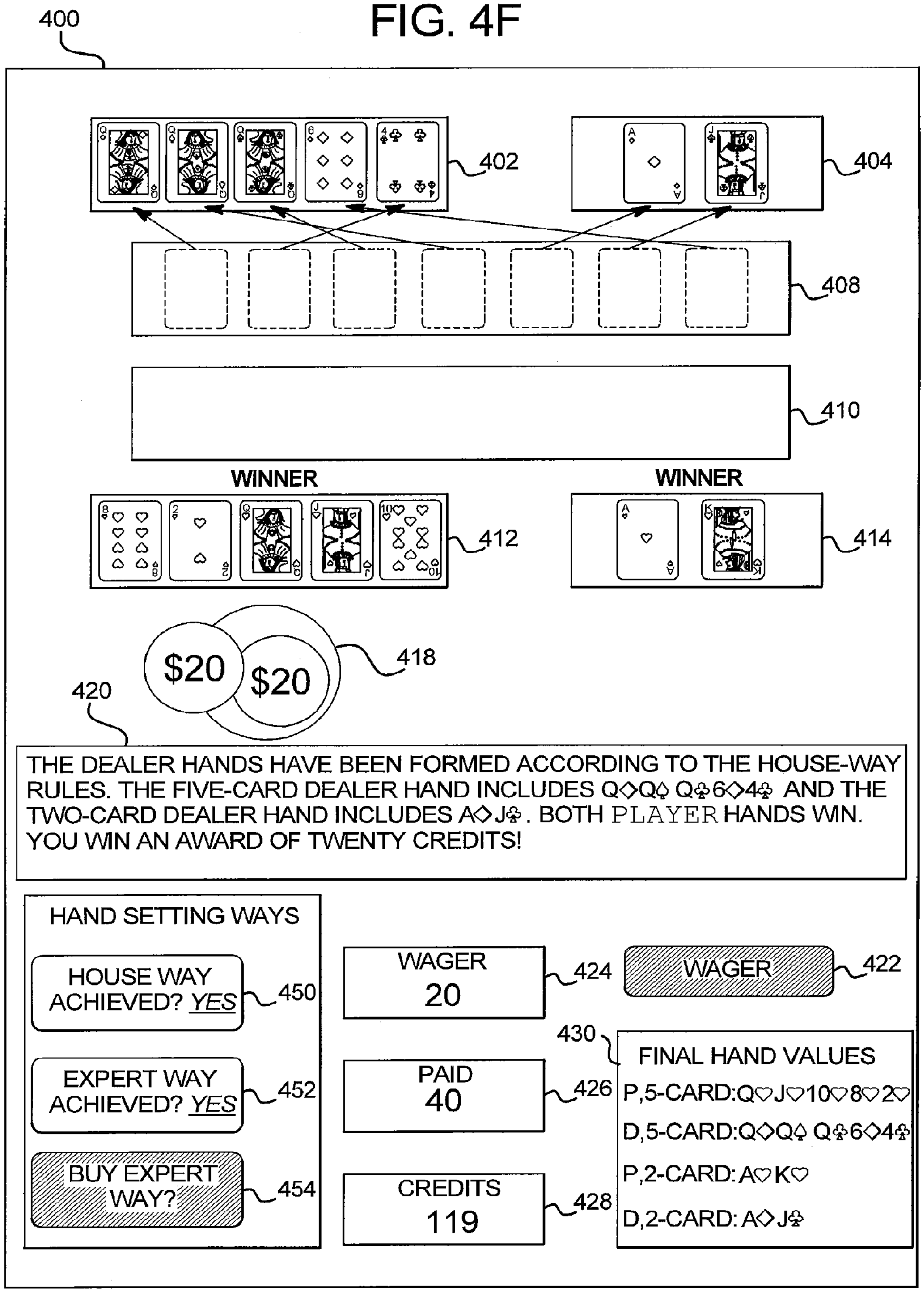

As shown in FIG. 4E, the gaming system 400 causes the seven dealer cards to be revealed in the dealer card area 408. In this example, the dealer cards include Q♦4♣Q♣Q♣A♦J♣6♦. As in the example above, the five-card dealer hand and the two-card dealer hand are set using the "House-Way" rule set. According to the "House-Way" rule set, if the seven dealer cards include a Three-Of-A-Kind, the dealer must place the Three-Of-A-Kind in the five-card dealer hand, unless the Three-Of-A-Kind includes three Aces. Because the Three-Of-A-Kind (i.e., Q♦Q♣Q♣) does not include three Aces, the three Queens are moved to the five-card dealer hand area 402 and the remaining two highest cards (i.e., A♦J♣) are moved to the two-card dealer hand area 404, as shown in FIG. 4F. Therefore, the final five-card dealer hand includes Q♦Q♣Q♣6♦4♣ and the final two-card dealer hand includes A♦J♣, as also indicated by message display 420 and final hand value display 430. The gaming system 400 then evaluates the final player hands and final dealer hands to determine a winner, as also indicated in the final hand value display 430. In this example round of play of the game, the five-card player hand (i.e., Q♥J♥10♥8♥2♥) having the rank of a Flush beats the five-card dealer hand (i.e., Q♦Q♣Q♣6♦4♣) having the rank of Three-Of-A-Kind, and the two-card player hand (i.e., A♥K♥) beats the two-card dealer hand (i.e., A♦J♣). Because both of the player hands have beaten the respective dealer hands, the player wins the round of play of the game, as indicated in message display 420. The gaming system 400 displays an award of twenty credits, as indicated in the award display 426 and the message display 420. The gaming system 400 also updates the total player credits from seventy-nine to one-hundred nineteen credits, as indicated in the credits display 428. In this example, if the player had not chosen to purchase the "Expert-Way" automatic hand setting option, the initial two-card player hand (i.e., 8♥2♥) would have lost to the final two-card dealer hand (i.e., A♦J♣) and the player would have pushed with the dealer. Therefore, at least in this example, purchasing the "Expert-Way" hand setting method benefited the player. This ends this example round of play of the game.

In one embodiment, the gaming system includes a plurality of potentially different hand setting ways to specify automatic player hand setting. That is, algorithms associated with one hand setting way may result in the same final hands as different algorithms associated with a second hand setting way. The hand setting ways that can be used to set a player hand include the "House-Way" rules that are used in setting the dealer hands, a plurality of other "House-Way" rules that are used by different gaming establishments, and optimal play or "Expert-Way" rules. In one embodiment, any player can select from the different automatic hand setting ways without paying a fee and without meeting any other qualifying conditions. In one example, the player can utilize any accumulated frequent player points to "buy"the "Expert-Way" card setting. In other embodiments, the player must meet one or more qualifying conditions to having the option to select from the different automatic hand setting ways. The following conditions can be required individually or in any suitable combination to have the option to use one or more hand setting ways: (a) the player must be playing the game for money; (b) the player must place at least a specific minimum wager; (c) the player must have at least a specific minimum credit balance; (d) the player must be playing with a player tracking card; (e) the player must have a certain casino club standing or membership; (f) a separate wager or pre-payment fee must be made; (g) the player must place a side wager of a particular amount; (h) the player must agree to pay a higher commission rate for a winning hand than the standard winning-hand commission rate; (i) the player must be acting in the role of banker; (j) the player must not be acting in the role of banker; (k) the player is playing during a designated time period; (l) the player has received a certain hand outcome that activates this feature; (m) the player has met a requirement to have played a certain number of hands; (n) the player has met a requirement to have wagered a certain amount; (o) the player has met a requirement of having lost a certain number of hands over a certain period; and (p) the player has met a requirement of having lost a certain amount of money. In certain embodiments, the player is only offered one method for setting his/her player's hand, whereby this method is either the House-Way or, if said player qualifies, this method is the Expert Way.

In one embodiment of a video based Pai Gow Poker game, the gaming establishment can select "House-Way" rules for the video Pai Gow Poker gaming devices to match the rules of: (a) felt-based table games offered at that particular gaming establishment; (b) felt-based table games offered within the consortium to which the gaming establishment belongs; or (c) the local market. On a single-player gaming device, such as offered via the Internet or other networked gaming tablet, the gaming system provides the player with the option of selecting which set of "House-Way" rules will be used by the game to set the dealer hands.

In one embodiment, there are a plurality of ways for either the player of the dealer to set the dealer hand setting rules. In one example, the player may select which particular set of "House-Way" rules that the dealer must use when setting the cards in the dealer hands. In one embodiment, the automatic hand setting rules are different for the player hands and the dealer hands. In one embodiment, the player is able to utilize an optimal way or "Expert-Way" of hand setting for the player hands while the dealer must use a traditional and less optimal method of setting the cards in the dealer hands. In this embodiment, the player has a certain advantage over the dealer with regard to card setting. In an embodiment where the casino takes a percentage of each player win (e.g., a vig) this card setting advantage given to the player at least partially offsets the casino take. In another embodiment, the dealer is able to utilize an optimal way or "Expert-Way" of hand setting for the dealer hands, while the player must use a traditional and less optimal method of setting the cards in the player hands.

In one multiplayer Pai Gow Poker embodiment, each of the players have the option to select from several different automatically hand setting rule sets (e.g., "House-Way-1" rules, "House-Way-2" rules, etc.). Therefore, in this embodiment, it is possible that different players at the same table may utilize different rule sets in the same round of play of the game.

In other embodiments, a number of player cards other than seven are dealt. For example, three, four, five, six, or more than eight player cards can be dealt. In these embodiments, the player forms two or three, or more than three hands according to the rules of the game. In certain variations, there are restrictions as to what hand settings are permitted. In one example, the player forms a high player hand and a low player hand from the initially dealt player cards, where the high player hand must have a poker ranking higher than that of the low player hand. Also, the number of cards in the high player hand must be equal to or greater than the number of cards in the low player hand. In one example embodiment, seven player cards are dealt and the player forms a three card first hand, a three card second hand, and a one card third hand. In this embodiment, a poker ranking of the first player hand must be set to be greater than a poker ranking of the second player hand, and the poker ranking of the second player hand must be set to be greater than a poker ranking of the third single card hand. In certain embodiments, a hand can be a game element or group of game elements other than playing cards. As in the embodiments, described above, the gaming system enables the player to select from a plurality of different automatic hand setting "House-Way" rules. In Pai Gow Poker, it should be appreciated that the card setting in the first hand is deterministic of the cards in the second hand. That is, after five cards are designated to be the cards in the first hand, the only two cards remaining will form the second hand.

In one embodiment, the concept of utilizing a "Expert-Way" setting method is applied to a multiple line slot machine game. In this embodiment, the player is able to play of plurality of different paylines of the slot machine. The player also has an option to replace a symbol on a reel with a different symbol or to rearrange one or more symbols on the screen to achieve a larger total award. For example, if one symbol is moved, replaced or rearranged, the awards associated with one or multiple paylines may be increased. The awards associated with other paylines could also possibly decrease, but the goal for the player would be to have a larger total award from all of the paylines. In this embodiment, the player can select an automatic symbol replacement or rearrangement method and the gaming system will change the appropriate symbols on the reels to maximize the player's award. This automatic symbol replacement or rearrangement method can be offered at an additional charge to the player or for a percentage of the total award.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one input device;

at least one processor;

at least one display device; and at least one memory device storing a plurality of instructions which when executed by the at least one processor, cause the at least one processor to operate with the at least one display device and the at least one input device to, for a play of a game:

(a) enable a wager to be placed, (b) after receiving an input of a placed wager, deal a designated number of dealer cards and deal a designated number of player cards, (c) enable one of a plurality of different automatic player hand setting methods to be selected by a player, wherein each of the plurality of different automatic player hand setting methods has at least one different predefined rule to automatically set a first a player hand and a second player hand from the dealt designated number of player cards, (d) if one of the automatic player hand setting methods is selected, apply the selected automatic player hand setting method to form the first player hand and the second player hand from the dealt designated number of player cards, (e) if one of the automatic player hand setting methods is not selected, enable manual setting of the first and second player hands, (f) reveal the dealt designated number of dealer cards and form a first dealer hand and a second dealer hand from the dealt designated number of dealer cards according to a dealer hand setting method, and (g) determine any awards based on the first and second player hands and the first and second dealer hands.

2. The gaming system of claim 1, wherein the designated number of dealer cards is seven and the designated number of player cards is seven.

3. The gaming system of claim 1, wherein the cards are dealt from a standard fifty-two card deck.

4. The gaming system of claim 1, where in the cards are dealt from a deck including at least one Joker card.

5. The gaming system of claim 1, wherein the first player hand includes five cards, the second player hand includes two cards, the first dealer hand includes five cards, and the second dealer hand includes two cards.

6. The gaming system of claim 1, wherein a rank of the second dealer hand is not greater than a rank of the first dealer hand.

7. The gaming system of claim 1, wherein a rank of the second player hand is not greater than a rank of the first player hand.

8. The gaming system of claim 5, wherein the determination of any award includes a determination of if the two-card player hand beats the two-card dealer hand, and a determination of if the five-card player hand beats the five-card dealer hand.

9. The gaming system of claim 8, wherein a rank of the two-card player hand must be less than a rank of the five-card player hand, and a rank of the two-card dealer hand must be less than a rank of the five-card dealer hand.

10. The gaming system of claim 1, wherein a separate fee is required for each play of the game to be eligible to select one of the plurality of automatic hand setting methods.

11. The gaming system of claim 1, wherein a separate fee is required if one of the plurality of automatic hand setting methods is selected and if the player wins.

12. The gaming system of claim 11, wherein the fee is a percentage of the wager.

13. The gaming system of claim 1, wherein one of the automatic player hand setting methods is the dealer hand setting method.

14. The gaming system of claim 1, wherein the dealer hand setting method includes sub-optimal hand setting rules relative to at least one of the automatic player hand setting methods.

15. The gaming system of claim 1, wherein the automatic player hand setting methods include a first automatic player hand setting method and a second automatic player hand setting method, wherein said second automatic player hand setting method provides a greater statistical win advantage to a player relative to the first automatic player hand setting method.

16. The gaming system of claim 15, wherein the second automatic player hand setting method is only available to players playing for cash when both cash play and non-cash play are available.

17. The gaming system of claim 15, wherein the second automatic player hand setting method is available based on a minimum wager amount.

18. The gaming system of claim 15, wherein the second automatic player hand setting method is available based on a minimum player credit balance.

19. The gaming system of claim 15, wherein the second automatic player hand setting method is only available when the game is played in conjunction with a player tracking card.

20. The gaming system of claim 15, wherein the second automatic player hand setting method is available based on a casino membership status of a player.

21. The gaming system of claim 15, wherein the second automatic player hand setting method is available for a fee.

22. The gaming system of claim 21, wherein the fee must be paid at a beginning of the play of the game.

23. The gaming system of claim 21, wherein the fee can be paid after a beginning of the play of the game.

24. The gaming system of claim 15, wherein the second automatic player hand setting method is available based on a minimum amount of a side wager.

25. The gaming system of claim 1, wherein when instructions are executed by the at least one processor, the at least one processor operates with the at least one display device and the at least one input device to enable selection of the dealer hand setting method by a player as one of the automatic player hand setting methods.

26. The gaming system of claim 1, wherein each of the automatic player hand setting methods provide a greater statistical win advantage to the player relative to the dealer hand setting method.

27. The gaming system of claim 1, wherein the dealer hand setting method provides a greater statistical win advantage to the player relative to any of the player hand setting rule sets.

28. A gaming system comprising:

at least one input device;

at least one processor;

at least one display device; and at least one memory device storing a plurality of instructions which when executed by the at least one processor, cause the at least one processor to operate with the at least one display device and the at least one input device to, for a play of a Pai Gow Poker game:

(a) enable a wager to be placed, (b) after receiving an input indicating that a wager has been placed, deal a designated number of dealer cards and deal a designated number of player cards, (c) after receiving at least one player card setting input, form a first player hand and a second player hand from the dealt designated number of player cards, a rank of the second player hand not being greater than a rank of the first player hand, (d) generate an indication if the formed first player hand and second player hand are inconsistent with one or more of a plurality of different selectable automatic player hand setting methods, wherein each of the plurality of different selectable automatic player hand setting methods has at least one different predefined rule to automatically set the first player hand and the second player hand from the dealt designated number of a player cards, (e) upon receiving an input that one of the automatic player hand setting methods has been selected by a player, apply the selected automatic player hand setting method to re-form the first player hand and the second player hand according to the selected hand setting method, (f) reveal the dealt designated number of dealer cards and form a first dealer hand and a second dealer hand according to a dealer hand setting method, a rank of the second dealer hand not being greater than a rank of the first dealer hand, and (g) determine any awards based on the first and second player hands and the and second dealer hands.

29. The gaming system of claim 28, wherein the designated number of dealer cards is seven and the designated number of player cards is seven.

30. The gaming system of claim 29, wherein the first player hand includes five cards, the second player hand includes two cards, the first dealer hand includes five cards, and the second dealer hand includes two cards.

31. The gaming system of claim 30, wherein determining the award includes determining if the two-card player hand beats the two-card dealer hand, and determining if the five-card player hand beats the five-card dealer hand.

32. The gaming system of claim 28, wherein selection of one of the plurality of different selectable automatic player hand setting methods is available for a fee.

33. The gaming system of claim 32, wherein the fee must be paid at a beginning of the play of the game.

34. The gaming system of claim 32, wherein the fee can be paid after a beginning of the play of the game.

35. The gaming system of claim 28, wherein selection of one of the plurality of different selectable automatic player hand setting methods is available based on a minimum wager amount.

36. The gaming system of claim 28, wherein selection of one of the plurality of different selectable automatic player hand setting methods is available based on a minimum player credit balance.

37. The gaming system of claim 28, wherein selection of one of the plurality of different selectable automatic player hand setting methods is available when the game is played in conjunction with a player tracking card.

38. The gaming system of claim 28, wherein selection of one of the plurality of different selectable automatic player hand setting methods is available based on a casino membership status of a player.

39. The gaming system of claim 28, wherein the game is a multiplayer game, and wherein each of the different players may select a different one of the plurality of different selectable automatic player hand setting methods.

40. A gaming system comprising:

at least one input device;

at least one processor;

at least one display device; and at least one memory device storing a plurality of instructions which when executed by the at least one processor, cause the at least one processor to operate with the at least one display device and the at least one input device to, for a play of a game:

(a) enable a wager to be placed, (b) after receiving an input of a placed wager, generate and display a designated number of player game elements, (c) upon receiving an input that one of a plurality of different automatic player hand setting methods has been selected by a player, apply the selected automatic player hand setting method to form a first player hand and a second player hand from the displayed generated game elements, wherein each of the plurality of different automatic player hand setting methods has at least one different predefined rule to automatically set the first player hand and the second player hand from the generated game elements, (d) if one of the automatic player hand setting methods is not selected, enable manual setting of the first and second player hands, and (e) after the first and second player hands are set, determine any awards based on the first and second player hands.

41. The gaming system of claim 40, wherein the number of player game elements is seven.

42. The gaming system of claim 41, wherein the player game elements are cards.

43. A gaming system comprising:

at least one input device;

at least one processor;

at least one display device; and at least one memory device storing a plurality of instructions which when executed by the at least one processor, cause the at least one processor to operate with the at least one display device and the at least one input device to, for a play of a game:

(a) enable a wager to be placed, (b) after receiving an input indicating that a wager has been placed, generate and display a designated number of dealer game elements and generate and display a designated number of player game elements, (c) after receiving at least one player game element setting input, form a first player hand and a second player hand from the displayed generated player game elements, a rank of the second player hand not being greater than a rank of the first player hand, (d) generate an indication if the formed first player hand and second player hand are inconsistent with one or more of a plurality of different selectable automatic player hand setting methods, wherein each of the plurality of different selectable automatic player hand setting methods has at least one different predefined rule to automatically set the first player had and the second player hand from the dealt designated number of player cards, (e) upon receiving an input that one of the plurality of different selectable automatic player hand setting methods has been selected by a player, apply the selected automatic player hand setting method to re-form the first player hand and the second player hand according to the selected automatic player hand setting method, and (f) after the first and second player hands have been set, determine any awards based on the first and second player hands.

44. The gaming system of claim 43, wherein the number of dealer game elements is seven and the number of player game elements is seven.

45. The gaming system of claim 44, where in the game elements are cards.

* * * * *

UNITED STATES PATENT AND TRADEMARK OFFICE

CERTIFICATE OF CORRECTION

PATENT NO. : 8,216,039 B2
APPLICATION NO. : 12/187058
DATED : July 10, 2012
INVENTOR(S) : Mark C. Nicely et al.

It is certified that error appears in the above-identified patent and that said Letters Patent is hereby corrected as shown below:

IN THE CLAIMS

In Claim 10, Column 31, Line 10, between “automatic” and “hand” insert --player--.
In Claim 11, Column 31, Line 12, between “automatic” and “hand” insert --player--.
In Claim 12, Column 31, Line 15, between “the” and “wager” insert --placed--.
In Claim 15, Column 31, Line 28, replace “a” with --the--.
In Claim 20, Column 31, Line 45, replace “a” with --the--.
In Claim 25, Column 31, Line 55, after “when” insert --the--.
In Claim 25, Column 31, Line 59, replace “a” with --the--.
In Claim 26, Column 31, Line 62, replace “provide” with --provides--.
In Claim 27, Column 31, Line 67, between the second instance of “the” and “player” insert --automatic-- and replace “rule sets” with --methods--.
In Claim 28, Column 32, Line 11, replace “a” with --the--.
In Claim 28, Column 32, Line 26, delete “a”.
In Claim 28, Column 32, Line 32, between “selected” and “hand” insert --automatic player--.
In Claim 28, Column 32, Line 39, between “the” and “and” insert --first--.
In Claim 33, Column 32, Line 55, between “the” and “game” insert --Pai Gow Poker--.
In Claim 34, Column 32, Line 57, between “the” and “game” insert --Pai Gow Poker--.
In Claim 38, Column 33, Line 6, replace “a” with --the--.
In Claim 39, Column 33, Line 7, between “the” and “game” insert --Pai Gow Poker--.
In Claim 39, Column 33, Line 8, replace “the” with --a plurality of--.
In Claim 40, Column 33, Line 28, between “generated” and “game” insert --player--.
In Claim 40, Column 33, Line 32, between “the” and “generated” insert --displayed-- and after “generated” insert --player--.
In Claim 41, Column 33, Line 39, between “the” and “number” insert --designated--.
In Claim 43, Column 34, Line 11, replace “a” with --the--.
In Claim 43, Column 34, Line 25, replace “had” with --hand--.
In Claim 43, Column 34, Line 26, replace “dealt designated number of” with --displayed generated--.
In Claim 43, Column 34, Line 27, replace “cards” with --game elements--.

Signed and Sealed this
Sixteenth Day of October, 2012

David J. Kappos

David J. Kappos
*Director of the United States Patent and Trademark Office*

IN THE CLAIMS

In Claim 44, Column 34, Line 37, between “the” and “number” insert --designated--.
In Claim 44, Column 34, Line 38, between “the” and “number” insert --designated--.
In Claim 45, Column 34, Line 40, replace “where in” with --wherein--.